US008028285B2

(12) United States Patent
Ly et al.

(10) Patent No.: US 8,028,285 B2
(45) Date of Patent: Sep. 27, 2011

(54) HETEROGENEOUS JOB DASHBOARD

(75) Inventors: An V. Ly, Sarasota, FL (US); Arun Padmanabhan, Riverview, FL (US); Edward F. Chen, Sarasota, FL (US)

(73) Assignee: Computer Associates Think, Inc., Islandia, NY (US)

( * ) Notice: Subject to any disclaimer, the term of this patent is extended or adjusted under 35 U.S.C. 154(b) by 1109 days.

(21) Appl. No.: 11/186,307

(22) Filed: Jul. 20, 2005

(65) Prior Publication Data
US 2006/0017975 A1    Jan. 26, 2006

Related U.S. Application Data

(60) Provisional application No. 60/590,405, filed on Jul. 22, 2004.

(51) Int. Cl.
*G06F 9/46* (2006.01)
*G06K 15/00* (2006.01)

(52) U.S. Cl. .................. 718/102; 718/100; 358/1.18

(58) Field of Classification Search .................. 718/101, 718/102; 715/730
See application file for complete search history.

(56) References Cited

U.S. PATENT DOCUMENTS

| 4,635,189 A | 1/1987 | Kendall ........................ 364/200 |
| 5,218,699 A | 6/1993 | Brandle et al. |
| 5,414,845 A | 5/1995 | Behm et al. .................... 395/650 |
| 5,437,032 A | 7/1995 | Wolf et al. |
| 5,457,797 A | 10/1995 | Butterworth et al. |
| 5,471,615 A | 11/1995 | Amatsu et al. |
| 5,493,635 A | 2/1996 | Brindle et al. |
| 5,812,843 A | 9/1998 | Yamazaki et al. |
| 5,870,604 A | 2/1999 | Yamagishi |
| 5,872,970 A | 2/1999 | Pickett et al. .................. 395/671 |
| 5,873,659 A * | 2/1999 | Edwards et al. ................ 400/61 |
| 5,893,905 A | 4/1999 | Main et al. ...................... 705/11 |
| 6,076,174 A * | 6/2000 | Freund ............................ 714/47 |
| 6,199,099 B1 | 3/2001 | Gershman et al. |
| 6,205,469 B1 | 3/2001 | Graham |
| 6,289,368 B1 * | 9/2001 | Dentler et al. ................ 718/101 |
| 6,356,917 B1 | 3/2002 | Dempsey et al. |

(Continued)

FOREIGN PATENT DOCUMENTS
WO    WO 96/31035    10/1996
(Continued)

OTHER PUBLICATIONS

Martin, David, "Job Scheduling—What's Old is New Again . . . Sort Of", *Online!*, Feb. 24, 2003, pp. 1-2, XP-002353991.

(Continued)

*Primary Examiner* — Emerson C Puente
*Assistant Examiner* — Camquy Truong
(74) *Attorney, Agent, or Firm* — Pillsbury Winthrop Shaw Pittman LLP

(57) ABSTRACT

This disclosure provides a system and method for summarizing jobs for a user group. In one embodiment, a job manager is operable to identify a state of a first job, the first job associated with a first job scheduler. A state of a second job is identified. The second job is associated with a second job scheduler. The first job scheduler and the second job scheduler are heterogeneous. A summary of information associated with at least the first job scheduler and the second job scheduler is determined using, at least in part, the first job state and the second job state. The summary is presented to a user though a dashboard.

16 Claims, 17 Drawing Sheets

U.S. PATENT DOCUMENTS

| | | | |
|---|---|---|---|
| 6,370,573 B1 * | 4/2002 | Bowman-Amuah | 709/223 |
| 6,438,553 B1 | 8/2002 | Yamada | |
| 6,513,057 B1 | 1/2003 | McCrory | 709/102 |
| 6,598,067 B1 | 7/2003 | Wydra et al. | |
| 6,615,261 B1 | 9/2003 | Smørgrav | 709/224 |
| 6,631,363 B1 | 10/2003 | Brown et al. | |
| 6,643,661 B2 | 11/2003 | Polizzi et al. | |
| 6,661,526 B1 | 12/2003 | Daly et al. | 358/1.13 |
| 6,687,018 B1 | 2/2004 | Leong et al. | |
| 6,694,345 B1 | 2/2004 | Brelsford et al. | |
| 6,751,657 B1 | 6/2004 | Zothner | 709/220 |
| 6,832,263 B2 | 12/2004 | Polizzi et al. | |
| 6,839,748 B1 * | 1/2005 | Allavarpu et al. | 709/223 |
| 6,988,109 B2 | 1/2006 | Stanley et al. | 707/103 Y |
| 7,043,728 B1 * | 5/2006 | Galpin | 718/102 |
| 7,058,953 B2 | 6/2006 | Willard et al. | 718/105 |
| 7,136,941 B2 * | 11/2006 | Nguyen et al. | 710/15 |
| 7,266,821 B2 | 9/2007 | Polizzi et al. | 718/100 |
| 7,386,586 B1 | 6/2008 | Headley et al. | 709/202 |
| 7,634,477 B2 | 12/2009 | Hinshaw | 707/10 |
| 7,886,296 B2 | 2/2011 | Ly et al. | 718/100 |
| 2002/0023122 A1 * | 2/2002 | Polizzi et al. | 709/202 |
| 2002/0156671 A1 * | 10/2002 | Libra et al. | 705/9 |
| 2002/0194248 A1 | 12/2002 | Wood et al. | |
| 2003/0009543 A1 | 1/2003 | Gupta | 709/223 |
| 2003/0061327 A1 | 3/2003 | Abdelhadi et al. | 709/223 |
| 2003/0110250 A1 | 6/2003 | Schnitzer et al. | 709/224 |
| 2003/0120706 A1 | 6/2003 | Harjula | 709/104 |
| 2003/0140170 A1 | 7/2003 | Rosensteel, Jr. et al. | |
| 2003/0140220 A1 | 7/2003 | Lawrance et al. | |
| 2003/0212542 A1 | 11/2003 | Lee et al. | |
| 2003/0233571 A1 | 12/2003 | Kraus et al. | 713/200 |
| 2004/0098447 A1 | 5/2004 | Verbeke et al. | |
| 2004/0223167 A1 | 11/2004 | Yu | |
| 2004/0239981 A1 | 12/2004 | Ducato et al. | 358/1.15 |
| 2004/0267818 A1 | 12/2004 | Hartenstine | 707/104.1 |
| 2005/0131865 A1 | 6/2005 | Jones et al. | |
| 2005/0165881 A1 | 7/2005 | Brooks et al. | 709/200 |
| 2006/0017953 A1 | 1/2006 | Ly et al. | 358/1.13 |
| 2006/0017954 A1 | 1/2006 | Ly et al. | 358/1.13 |
| 2006/0017969 A1 | 1/2006 | Ly et al. | 358/1.15 |
| 2006/0020942 A1 | 1/2006 | Ly et al. | 718/100 |

FOREIGN PATENT DOCUMENTS

| | | |
|---|---|---|
| WO | WO 02/086750 | 10/2002 |

OTHER PUBLICATIONS

Anonymous, "ISA Server 2004 Monitoring Features", *Online!*, Jun. 16, 2004, pp. 1-10, XP-002353992.

Anonymous, "Unicenter Enterprise Job Management r1 SP3", *Online!* Jun. 30, 2005, pp. 1-4, XP-002353993.

In U.S. Appl. No. 11/186,128, a non-final Office Action was mailed on Dec. 19, 2008.

In U.S. Appl. No. 11/186,128, a final Office Action was mailed on Jun. 8, 2009.

In U.S. Appl. No. 11/186,128, a non-final Office Action was mailed on Nov. 30, 2009.

In U.S. Appl. No. 11/186,308, a non-final Office Action was mailed on Dec. 8, 2009.

In U.S. Appl. No. 11/186,294, a non-final Office Action was mailed on Dec. 29, 2009.

In U.S. Appl. No. 11/186,280, a non-final Office Action was mailed on Jan. 6, 2010.

In U.S. Appl. No. 11/186,128, a final Office Action was mailed on Jun. 9, 2010.

In U.S. Appl. No. 11/186,308, a final Office Action was mailed on Jun. 23, 2010.

In U.S. Appl. No. 11/186,294, a final Office Action was mailed on Jun. 23, 2010.

In U.S. Appl. No. 11/186,280, a final Office Action was mailed on Jul. 19, 2010.

In U.S. Appl. No. 11/186,280, a Notice of Allowance was mailed on Sep. 29, 2010.

In U.S. Appl. No. 11/186,308, a non-final Office Action was mailed on Oct. 6, 2010.

In U.S. Appl. No. 11/186,294, a non-final Office Action was mailed on Nov. 15, 2010.

In U.S. Appl. No. 11/186,128, a non-final Office Action was mailed on Nov. 26, 2010.

In European Patent Application No. 05770206.0, a Communication Pursuant to Article 94(3) EPC was mailed on Jan. 25, 2011 by the European Patent Office.

In U.S. Appl. No. 11/186,308, a Notice of Allowance was mailed on Mar. 4, 2011.

* cited by examiner

HETEROGENEOUS JOB DASHBOARD

RELATED APPLICATION

This application claims priority under 35 U.S.C. §119 of Provisional U.S. Application Ser. No. 60/590,405 filed Jul. 22, 2004.

TECHNICAL FIELD

This disclosure generally relates to enterprise job scheduling and, more specifically, to a system and method for providing a heterogeneous job dashboard.

BACKGROUND

There are numerous heterogeneous operating environments for jobs, applications or other processes. Typically, each of these operating environments comprise one of disparate operating systems including UNIX, Windows or Windows Server, Linux, z/OS or other mainframe OS, and others. Generally, these jobs or applications, whether enterprise or consumer, are compatible or optimized for one of these heterogeneous operating systems. Some properties of these jobs are similar across the heterogeneous systems, while others are unique to each operating system, job type, or job dependencies. For example, the status property of a job residing in an enterprise job scheduler for a mainframe system may indicate one of the following example states: "Abend," "Requeued," "JCL Error," and others. But the status of a second job residing in an enterprise job scheduler for a Unix-based system may indicate one of the following example states: "Exited," "Running," "Suspended," "Failed," and such.

SUMMARY

This disclosure provides a system and method for summarizing jobs for a user group. In one embodiment, a job manager is operable to identify a state of a first job, the first job associated with a first job scheduler. A state of a second job is identified. The second job is associated with a second job scheduler. The first job scheduler and the second job scheduler are heterogeneous. A summary of information associated with at least the first job scheduler and the second job scheduler is determined using, at least in part, the first job state and the second job state. The summary is presented to a user.

The details of one or more embodiments of the disclosure are set forth in the accompanying drawings and the description below. Particular features, objects, and advantages of the disclosure will be apparent from the description and drawings and from the claims.

DETAILED DESCRIPTION

Figure 1:
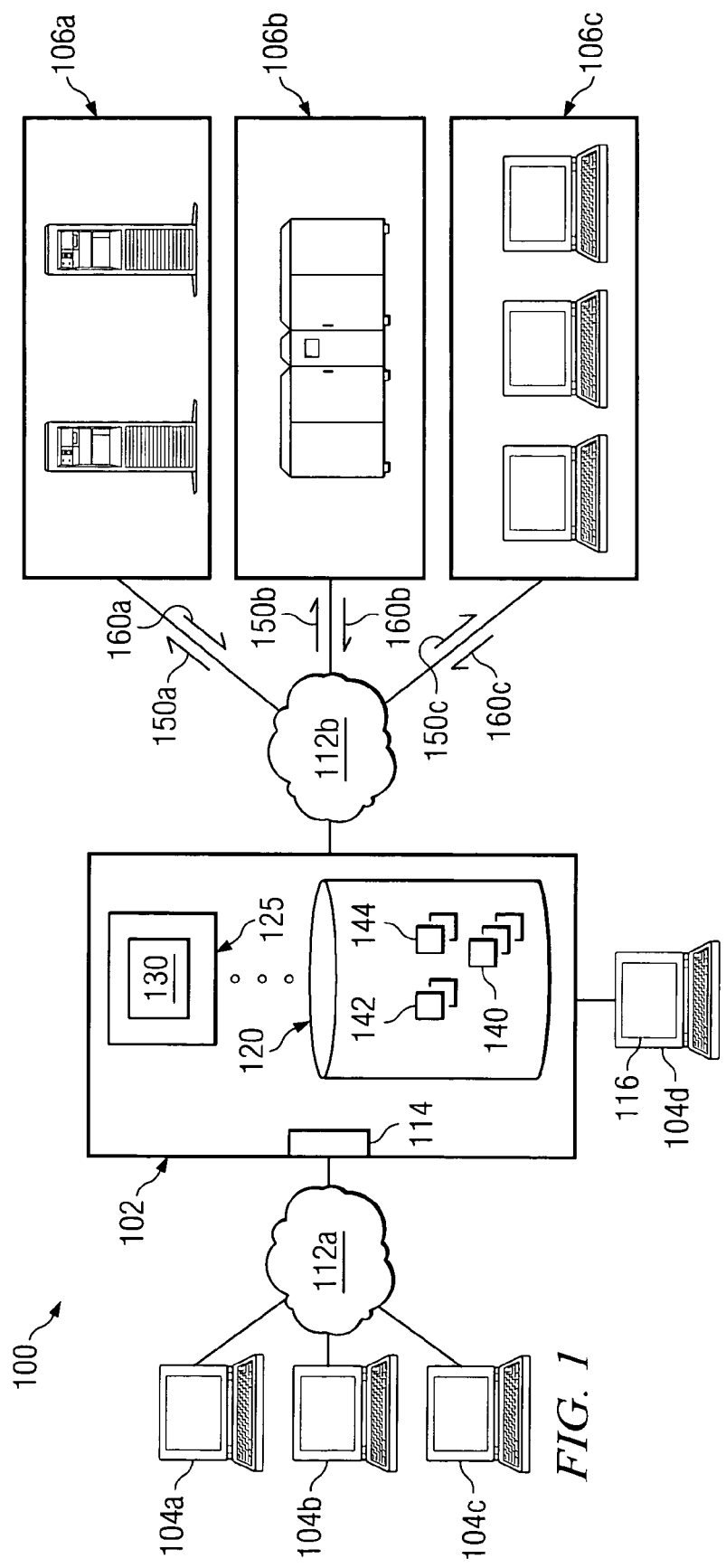
FIG. 1 illustrates a heterogeneous job dashboard system in accordance with one embodiment of the present disclosure.

FIG. 1 illustrates a job dashboard system 100 for providing a summary of a user group of an enterprise in accordance with one embodiment of the present disclosure. A user group may comprise a department, a job type, the entire enterprise, or any other portion of the enterprise that may span heterogeneous operating environments 106. The summary typically includes statistical information based, at least in part, on job objects 140 and alert objects 142. Statistical information may include counts of jobs, counts of alerts, counts of job states, counts of alert states, percentages of job states, percentages of alert states, or any other suitable information numerically derived from job properties and/or alert properties. For example, job dashboard system 100 may determine the number of failed jobs, as well as the percentage of such to the total number of jobs. Heterogeneous operating environments 106 often include job schedulers that are incompatible or at least partially incompatible such that processing properties and metrics and assessing the overall operating level of a user group is difficult. For example, operating environment 106b may include a job scheduler for a mainframe system that indicates a job failure as "JCL Error," and operating environment 106a may include a job scheduler for a Unix-based system that indicates a job failure as "Failed." In addressing the heterogeneousness, system 100 uses job objects 140 and alert objects 142 to identify properties of jobs 150 and alerts of jobs 150 and determine associated statistical information of the user group and present the results to a user. Further, job dashboard system 100 may determine a severity level of the user group that represents an overall status of that portion of the enterprise, which may be presented to the user. Generally, users may include any user of system 100 or one of its components such as, for example, job scheduling personnel with the ability to schedule jobs, forecast future scheduling requirements, analyze and measure the effectiveness of the job flow, automated job management policies, and/or manage jobs on distributed networks.

At a high level, system 100 is all or a portion of the enterprise that includes or is communicably coupled with server 102, one or more clients 104, and a plurality of heterogeneous operating environments 106. For example, system 100 may be associated with the entire enterprise, a geographical or logical location within the enterprise, or any other portion of the enterprise. It will be understood that the enterprise may be a corporation, non-profit organization, government agency, or any other person or entity that includes, utilizes, or receives the results from multiple computing devices and operating environments 106. In other words, job dashboard system 100 is typically a distributed client/server system that allows users of clients 104 to view summaries of user groups that may span the plurality of operating environments 106. But system 100 may be any other suitable environment without departing from the scope of this disclosure. Generally, "dynamically," as used herein, means that certain processing is determined, at least in part, at run-time based on one or more variables. Whereas the term "automatically," as used herein, generally means that appropriate processing is substantially performed by at least part of job dashboard system 100. It should be understood that "automatically" further contemplates any suitable administrator or other user interaction with system 100 without departing from the scope of this disclosure.

Returning to the illustrated embodiment, system 100 includes, invokes, executes, references, or is communicably coupled with a plurality operating environments 106. Each operating environment 106 is any system or subsystem operable to at least partially or fully execute or process jobs 150. For example, each operating environment 106 is one of a plurality of heterogeneous environments including Unix, Linux, Windows, or mainframe environments, as well as others. In another example, an operating environment 106 may represent a particular application. Moreover, each operating environment 106 may include one server or may be distributed across a plurality of computers. For example, illustrated system 100 includes three operating environments 106a, 106b, and 106c respectively. In this example, first operating environment 106a is server environment executing UNIX, second operating environment 106b is a mainframe environment executing z/OS, and third operating environment is a distributed processing environment including a plurality of clients executing Windows. In another example, two operating environments 106 may be executing the same operating system, but may include different storage capabilities, file systems, or computing devices. In yet another example, two operating environments 106 may be substantively similar or identical, except for executing two disparate cyclical releases or versions of the same operating system. As illustrated in FIGS. 2A-E, each operating environment 106 typically includes one or more job schedulers 137, each of which may be tailored to, designed for, or at least partially compatible with job executing in the associated operating environment 106. In this case, "operating environment 106" and "job scheduler 137" may be used interchangeably as appropriate. Of course, illustrated operating environments 106 are for example purposes only. Indeed, while illustrated separately, server 102 may represent, include, or execute one of the operating environments 106 or one of the operating environments 106 may include or utilize server 102 without departing from the scope of the disclosure.

Illustrated server 102 includes memory 120 and processor 125 and comprises an electronic computing device operable to receive, transmit, process and store data associated with system 100. For example, server 102 may be any computer or processing device such as, for example, a blade server, general-purpose personal computer (PC), Macintosh, workstation, Unix-based computer, or any other suitable device. Generally, FIG. 1 provides merely one example of computers that may be used with the disclosure. For example, although FIG. 1 illustrates one server 102 that may be used with the disclosure, server 102 can be implemented using computers other than servers, as well as a server pool. Server 102 may be adapted to execute any operating system including Linux, UNIX, Windows Server, z/OS or any other suitable operating system. But, the present disclosure contemplates servers other than general purpose computers as well as servers without conventional operating systems. According to one embodiment, server 102 may also include or be communicably coupled with a web server and/or a data server.

Memory 120 may include any memory or database module and may take the form of volatile or non-volatile memory including, without limitation, magnetic media, optical media, random access memory (RAM), read-only memory (ROM), removable media, or any other suitable local or remote memory component. In the illustrated embodiment, memory 120 includes job objects 140, alert objects 142, and dashboard objects 144, but may also include any other appropriate data such as a job history, normalization policies, filters, a security or audit log, print or other reporting files, HTML files or templates, and others. Job objects 140 are representations of enterprise jobs and their associated properties. These jobs may be update or report batch jobs, database processing utilities, commands, or other tasks. Each job object 140 typically comprises at least a mapping of property names to values that represent the parameters, variables, output format, or other details of the associated job. For example, job object 140 comprises at least a job identifier and a pointer or other reference to the appropriate or associated operating environment 106. The environment pointer may be automatically, dynamically, or manually populated based on operating system compatibility, data storage location, application, utilization, priority, department or business rules, geography, other criteria or characteristics, or any combination thereof. In another example, each job object 140 may include job predecessor, job successor, triggers, calendar, VRM requirements, dataset predecessors, user requirements, and network predecessors. In certain embodiments, the constituent data may be dynamically populated based on the particular type of job. For example, in the case of a distributed job, job object 140 may include two or more identifiers of the associated operating environments, while a standalone job merely includes one environment pointer. Job object 140 may be in any appropriate logical or physical format including an executable, a Java object, text, SQL, XML, and such. Indeed, job object 140 may be a default job or a particular instance of a job as appropriate. Moreover, job object 140 may be keyed on or associated with a user, a user or security group, a department, or any other variable or property. As described in more detail below, job object 140 may include properties that directly stored or normalized.

Alert objects 142 are representations of enterprise job alerts and their associated properties. These job alerts may be generated in response to a specific job transitioning to certain states, completion of a specified job or jobset, or any other event associated with jobs 150. For example, an alert object 142 may be generated if a critical job fails to complete. Each alert object 142 typically comprises at least a mapping of property names to values that represent the parameters, variables, output format, or other details of the associated job alert. For example, alert object 142 typically comprises at least a job identifier, a job scheduler identifier, and a pointer or other reference to the appropriate or associated operating environment 106. Alert object 142 may include one or more the following: a unique alert identifier, an alert state, a class of alert, a name of alert queue, a status of alert, a text description for alert, a job identifier, a jobset identifier, a job scheduler identifier, a severity level, a creation time, and update time, and other properties or references to properties of the alert and/or job. In some embodiments, the alert states are critical, high, medium, low, opened, acknowledged, and closed. Alert object 142 may be in any appropriate logical or physical format including an executable, a Java object, text, Structured Query Language (SQL), eXtensible Markup Language (XML), and such. Alert object 142 may be associated with a transition to a job state, a transition to a severity level, a specific job 150, a specific job scheduler, a specific jobset, an operating environment 106 or any other suitable aspect of system 100.

Dashboard objects 144 (illustrated in more detail in FIG. 5) represent one or more summaries for user groups or other categories based on jobs 150 and alert of jobs 150 in the enterprise. For example, dashboard objects 144 may include statistical information about jobs 150 and alerts of jobs 150. As discussed above, the statistical information may include a count of each type of job state and alert state, a percentage of each type of job state and alert state in accordance with the total number of jobs and total number of alerts, respectively, or other suitable statistical information that may provide or be used to determine a summary of the enterprise. For example, the statistical information may include the number of failed jobs 150 and the percentage of failed jobs 150 in accordance with the total number of jobs. In addition to statistical information, dashboard object 144 may include a severity level representing an overall state of that portion of the enterprise. Dashboard objects 144 may store or define various data structures such as Java objects, XML, comma-separated-value (CSV) files, internal variables, SQL, or one or more libraries. In short, dashboard objects 144 may comprise one table, file, or object or a plurality of tables, files, or objects stored on one computer or across a plurality of computers in any appropriate format. Moreover, dashboard objects 144 may be local or remote without departing from the scope of this disclosure and store any type of appropriate data.

Furthermore, dashboard object 144 may include parameters, variables, algorithms, instructions, rules, or other directives for determining statistical information and/or the severity level using job objects 140 and/or alert objects 142. In some embodiments, dashboard object 144 implements these directives with one or more filters. The filter criteria may be compared, directly or indirectly, with statistical information of job objects 140 and/or alert objects 142. Dashboard object 144 may be a collection of tuple objects. Each example tuple object comprises three values: property names, property operator, and property value. The property name contains a name or alias of the property that is matched from the job or alert definition or instance. For example, the name could be "failed jobs" representing the number of failed jobs. The operator contains the mathematical or logical operation to be performed with the value and statistical information. In one example, the operator is ">". The property value contains a value to match or compare. For example, the value could be "75%." In certain embodiments, dashboard object 144 may allow multiple tuples. For example, the example filter may additionally include the following tuple: open alerts, >, and 60%. The interpretation of the specification of multiple tuples may require that all tuples be satisfied or one or more tuples be satisfied. In addition to the collection of tuple objects, dashboard object 144 may contain a reference, identifier, or other pointer to an instance of the associated one or more job scheduler's. As mentioned above, each instance of a job scheduler may be identified by machine name, network address, database name, or a combination of system, network, database and proprietary identifiers that represent a unique insulation of the associated job scheduler or operating environment 106. The filter criteria are typically compared with values computed or determined from, derived from, generated from, or otherwise associated with statistical information of job objects 140 and alert objects 142. For example, percentages of job states and/or alert states may be compared to the filter criteria. In the event of a match, dashboard object 144 may provide additional directives to assign a severity level value such as, for example, one of the following: running, low, medium, high, or critical. In some embodiments, dashboard objects 144 assign or otherwise associate a severity level value using percentages of job states and/or alert states. For example, if the filter criteria directs that the severity level be set to critical if the percentage of failed jobs exceed 10% and, in fact, the calculated statistics indicate that the percentage of failed jobs is 15%, then the filter criteria match and result in server 102 setting the severity level value to critical. The filter criteria may be based on other suitable calculated values such as a count of each job state, a total number of jobs, a count of each alert state, a total number of alerts, the combination of the foregoing, or other suitable values based, at least in part, on the job states and alert states.

Server 102 also includes processor 125. Processor 125 executes instructions and manipulates data to perform the operations of server 102 such as, for example, a central processing unit (CPU), a blade, an application specific integrated circuit (ASIC), or a field-programmable gate array (FPGA). Although FIG. 1 illustrates a single processor 125 in server 102, multiple processors 125 may be used according to particular needs and reference to processor 125 is meant to include multiple processors 125 where applicable. In the illustrated embodiment, processor 125 executes job manager 130, which performs at least a portion of the management of heterogeneous jobs 150 and/or the normalization of their properties.

Job manager 130 typically comprises any software component operable to allow users access to operating environments 106, submit jobs 150, query the status or other job properties, normalize some or all of these properties, or any other appropriate job management processing. As used herein, software generally includes any appropriate combination of software, firmware, hardware, and/or other logic. For example, job manager 130 may be written or described in any appropriate computer language including C, C++, C#, Java, J#, Visual Basic, assembler, Perl, any suitable version of 4GL, another language, or any combination thereof. It will be understood that while job manager 130 is illustrated in FIG. 1 as a single multi-tasked module, the features and functionality performed by this engine may be performed by multiple modules. For example, job manager 130 may be a job scheduler and a plurality of adapters 135 (see FIG. 2). In another example, job manager 130 may comprise a connection listener 304, a request controller 308 communicably coupled with a plurality of job parsers and managers, a view controller 314, a session manager 318, a template manager 320, an adapter manager 322, and a profile manager 324 (as shown in more detail in FIG. 3). Further, while illustrated as internal to server 102, one or more processes associated with job manager 130 may be stored, referenced, or executed remotely such as GUI 116 and one or more agents residing in the appropriate operating environments 106. Moreover, job manager 130 may be a child or sub-module of another software module (not illustrated) without departing from the scope of this disclosure. In certain embodiments, job manager 130 may include or be communicably coupled with an administrative workstation 104 or graphical user interface (GUI) through interface 114. In these embodiments, job manager 130 may run as a persistent process (e.g., a daemon or service) operable to listen on a particular port through or in interface 114.

Server 102 may also include interface 114 for communicating with other computer systems, such as clients 104, over network 112 in a client-server or other distributed environment. In certain embodiments, server 102 receives job submissions or customizations from internal or external senders through interface 114 for storage in memory 120 and/or processing by processor 125. Generally, interface 114 comprises logic encoded in software and/or hardware in a suitable combination and operable to communicate with network 112. More specifically, interface 114 may comprise software supporting one or more communications protocols associated with communications network 112 or hardware operable to communicate physical signals.

Network 112 facilitates wireless or wireline communication between computer server 102 and any other local or remote computer, such as clients 104. Illustrated network 112 comprises two sub-nets or virtual LANS, 112a and 112b, respectively. Indeed, while illustrated as two networks, network 112 may be a continuous network without departing from the scope of this disclosure, so long as at least portion of network 112 may facilitate communications between job manager 130 and one or more of the operating environments 106. In other words, network 112 encompasses any internal or external network, networks, sub-network, or combination thereof operable to facilitate communications between various computing components in system 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations.

Client 104 is any local or remote computing device operable to receive job submissions 150 and present output (such as properties or reports) via a GUI 116. At a high level, each client 104 includes at least GUI 116 and comprises an electronic computing device operable to receive, transmit, process and store any appropriate data associated with system 100. It will be understood that there may be any number of clients 104 communicably coupled to server 102. For example, illustrated clients 104 include one directly coupled client 104 and two communicably coupled clients to the illustrated server 102. Further, "client 104," "job owner," and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers to view user group summaries via GUI 116. As used in this disclosure, client 104 is intended to encompass a personal computer, touch screen terminal, workstation, network computer, kiosk, wireless data port, wireless or wireline phone, personal data assistant (PDA), one or more processors within these or other devices, or any other suitable processing device or computer. For example, client 104 may comprise a computer that includes an input device, such as a keypad, touch screen, mouse, or other device that can accept information, and an output device that conveys information associated with the operation of server 102 or clients 104, including digital data, visual information, or GUI 116. Both the input device and output device may include fixed or removable storage media such as a magnetic computer disk, CD-ROM, or other suitable media to both receive input from and provide output to users of clients 104 through the display, namely GUI 116.

GUI 116 comprises a graphical user interface operable to allow the user of client 104 to interface with at least a portion of system 100 for any suitable purpose. Generally, GUI 116 provides the user of client 104 with an efficient and user-friendly presentation of data provided by or communicated within system 100. For example, GUI 116 may be a front-end presenting one or more dashboard objects 144 and provide functionality to monitor jobs and alerts, as well as a summary of the jobs and alerts. GUI 116 may provide an alternate to a Business Scheduling View (BSV) graphical interface for monitoring. Further, GUI 116 may help the user by providing certain advantages including ease-of-use, compatibility with Java and non-Java browser platforms, and performance. Conceptually, the user logs into dashboard object 144 through GUI 116, which then presents statistical information associated with a user group. Using GUI 116, the user can define filters in order to configure his (or his group's) view to a specific set of jobs and/or job properties. After configuration, the user can save this view for later reuse. When a view is saved for later use, it may show up on a list of available, pre-configured views during login. This feature may give the user the ability to quickly see the same type of information from where he left off last time or provide the same view to other users. This feature may be referred to as serialization. Alternatively, the user can start on a new view by selecting from the list of filters in the view or modifying an existing filter. From an example "Dashboard" view, the user can select a filter and zoom into its details, thereby easily locating or viewing the specific properties. In addition to the Job Status view, GUI 116 may provide "Alert" and "Job Status" views. The example Alert view may show alerts that have been generated by job manager 130 or job scheduler 137 in response to a particular filter. The example Job Status view may allow the user to view and manage jobs 150. When multiple filters are applied to the Job Status, Alert, or Dashboard views, information from various heterogeneous job schedulers 137 may be collected into one view. This view shows the selected job and all its direct dependencies including its immediate predecessors, successors, triggers, resource and other requirements, and the current status of each. The consolidated data is often presented in a single way in an example "Enterprise" view. Thus, the Job Status, Alert and Dashboard views (as well as others) may be types or children of certain Enterprise views. Another view may be a Map view, which graphically displays the details of a selected job or jobset. Yet another view may be a Server Configuration view, in which the administrator or other authorized user can add, edit, and delete servers or operating environments 106 that are available to job manager 130. This view does not typically create back-end servers. Instead, it creates or populates the configuration information to access the environments 106 based on information supplied by the user. Of course, this configuration information may be automatically retrieved, received, or polled as appropriate. Each view may be static and/or dynamic as appropriate. Generally, static views do not change over time, while dynamic views automatically change at a regular update interval or dynamically update according to other criteria. In certain embodiments, GUI 116 may also present a "Credentialed User" view, allowing the user or administrator to add, edit, and delete credentialed users. The credentialed user information provides login credentials to back-end servers or operating environments 106. Credentialed users are set up to simplify access to the back-end servers/environments 106 and to provide an additional level of security. The portal user ID may be used as a key to access the credentialed user information. In addition to the portal user ID, the system administrator can set an environment password, which can be different than the Portal password. This feature is for users who have access to multiple back-end servers with the same user ID but different passwords for each. In addition, for each user ID in the credentialed user information, an alias ID can be establish. The alias ID can be either a group ID (one-to-many or many-to-one) or can be a user's personal ID for the back-end server. The alias ID has an associated password for the back-end server. In addition, a group user/group ID can be set to provide the credentials.

Regardless of the particular view or data, GUI 116 may comprise a plurality of customizable frames or windows having interactive fields, pull-down lists, and buttons operated by the user. In one embodiment, GUI 116 presents statistical information associated with job objects 140 and alert objects 142, including counts and percentages, and associated buttons and receives commands 170 from the user of client 104 via one of the input devices. This statistical information may be presented in tabular, graphical, and any other suitable format. Moreover, it should be understood that the term graphical user interface may be used in the singular or in the plural to describe one or more graphical user interfaces and each of the displays of a particular graphical user interface. Therefore, GUI 116 contemplates any graphical user interface, such as a generic web browser or touch screen, that processes information in system 100 and efficiently presents the results to the user. Server 102 can accept data from client 104 via the web browser (e.g., Microsoft Internet Explorer or Netscape Navigator) and return the appropriate HTML or XML responses using network 112. For example, server 102 may receive a status request using the web browser, determine statistical information associated with jobs and alerts, and present the results in the web browser.

In one aspect of operation, a user logs into job manager 130 using GUI 116 and is presented with the following example functionality or views: Administration, Monitoring, Configuration, and Event Management. Both the Administration and Monitoring views normally includes an applet deployed in an HTML page. The Configuration view is provided by a series of HTML pages that communicate with a Configuration servlet or process. The applets graphically display the objects defined in the job dashboard system. The applet communicates with the appropriate servlet or process to send and receive data to the job dashboard system. Event Management provides web-enabled access to the log facility. Job manager 130 may use the Jacada Terminal Emulator (JTE) to provide host emulation capabilities. In certain embodiments, the user may be provided access to certain functionality based on assignments to Portal workgroups. Based on the particular functionality selected by the user, job manager 130 may invoke a particular module from a Server/Web Server tier. This example level includes applets, servlets, servlet engines, and adapters.

Each servlet serves as a central point of communication and management between the GUI 116 (Applet and/or Portlet) and the one or more operating environments 106. The servlet is generally operable to expose a callable interface to GUI 116 to allow the end-user to configure and monitor jobs. The servlets, in turn, are operable to forward those calls into the various adapters that link with the particular environment 106. The servlets may be further operable to control client sessions. This session control typically involves session management, authentication, and persistency. As described in more detail in the embodiments of FIG. 2, each individual adapter 135 communicates with the servlets and the associated operating environment 106 and/or job scheduler 137. Adapters 135 encapsulate the job calls 150 to the operating environment 106 and/or job scheduler 137 and expose an API that the example servlets can use. In other words, once the user selects the appropriate action to take within one of the desired operating environments 106 (such as submitting a job using the associated job scheduler 137), the appropriate adapter 135 encapsulates the user command into an object 150 appropriate for the particular operating environment 106 and/or job scheduler 137. After any suitable amount of processing or job management, job scheduler 137 communicates output or job details to job manager 130 via the appropriate adapter 135 (perhaps in response to a query or automatically upon job completion or error). At this point, job manager 130 generates one or more job objects 140 and/or alert objects 142 using the information received from job scheduler 137. Prior to generating job objects 140 and/or alert objects 142, job manager 130 may normalized the received information and generate objects using the normalized information.

After generating job objects 140 and/or alert objects 142, job manager 130 uses dashboard object 144 to determine statistical information about jobs and alerts associated with a user group and present the information to a user. In response to a user request, job manager 130 identifies one or more dashboard objects 144, job objects 140, and alert objects 142 associated with the user group. Using the identified dashboard object 144, job manager 130 identifies properties and/or determines counts of the identified job objects 140 and alert objects 142. For example, job manager 130 may determine a count of each job state and alert state and their associated percentages in accordance with dashboard object 144. Dashboard object 144 may include directives to perform these processes at a specified interval. After the statistical information is determined, job manager 130 may then determine a severity level associated with the user group in accordance with dashboard object 144. Job manager 130 identifies one or more filters associated with the user group using dashboard object 144 and compares the identified filters with the statistical information. As discussed above, the filters may include one or more tuples. For example, job manager 130 may determine whether a percentage of the failed job states exceed a specified value. In the event of a match, job manager 130 assigns a severity level in accordance with dashboard object 144. In the case when dashboard object includes a plurality of filters, dashboard object 144 may require that all filters or one or more filters be matched before the severity level can be assigned to the user group.

FIGS. 2A-E illustrate various configurations of enterprise system 100 for executing jobs in heterogeneous operating environments 106. Generally, these figures illustrate a job manager 130 communicating with a job scheduler 137, resident in one of the operating environments 106, via an associated adapter 135. Put another way, job manager 130 may use adapters 135 to interface, normalize, or otherwise process communications from various heterogeneous job schedulers 137.

Each adapter 135 is an object or other module that encapsulates one or more types of job schedulers 137. Adapters 135 may be written or described in any particular format or programming language. For example, adapter 135 may be a Java object. Regardless of the particular format, adapter 135 is generally operable to provide APIs to job manager 130 for communication with each job scheduler 137 to manage and monitor job information. Put another way, adapter 135 may be logically located between job manager 130 and at least the associated job scheduler 137, thereby allowing job manager to be communicably coupled with the job scheduler 137. In certain embodiments, each adapter 135 may provide this compatibility by invoking, including, exposing, or executing one or more of the following example methods:

| Name | Description |
|---|---|
| List getJobStatus(List filters ) | Returns the job status data according to the given filters |
| Job getJobDetails(Map params ) | Returns the job details |
| void updateJobDetails(Job job ) | Updates the job details |
| List getRunLog( RunLogFilter filter ) | Returns the run log data according to the given filter |
| List getPriorRun( PriorRunFilter filter ) | Returns the prior run data according to the given filter |
| void actionJob(Job job, Map params ) | Perform action on the specified job |
| List getJobPreds(Job job, Map params ) | Returns the job predecessors of the specified job |
| List getJobVRMs(Job job, Map params ) | Returns the job VRMs of the specified job |
| void actionVRM(VRM vrm, Map params ) | Perform action on the specified job VRM |
| void actionPred(Pred pred, Map params ) | Perform action on the specified job predecessor |

There may be any number of adapters 135, each compatible with any appropriate number of job schedulers 137. For example, system 100 may include a mainframe job adapter 135 that provides APIs to allow communication with a mainframe-based job scheduler 137. These APIs allow the caller to read and write to different objects that exist within the mainframe job scheduler 137. These objects may include jobs, calendars, datasets, ARFSets, ARFs, JCL, triggers and predecessors. In another example, system 100 may include a distributed job adapter 135 that provides APIs to allow communication with a distributed job scheduler 137. This example distributed job scheduler 137 may run on any distributed platform such as Windows and Unix-based operating systems. As with the mainframe adapter 135, the APIs allow the caller to read and write to different objects (such as jobs, calendars and global variables) that exist within the distributed job scheduler 137.

Job scheduler 137 is any executable, routine, service, daemon, or other module or process that is operable to execute, monitor, or otherwise manage jobs 150 in at least one operating environment 106. Typically, job scheduler 137 is associated with a particular type, format, or compatibility of job 150. But, as illustrated in the various embodiments, any job scheduler 137 may be also be configured to run as a more varied job scheduler or even a master job scheduler 137 managing a plurality of slave job schedulers 137. Moreover, while job scheduler 137 is illustrated as residing within a particular operating environment 106, it will be understood that is for example purposes only and merely illustrates that job scheduler 137 is associated with the particular environment 106. Indeed, job scheduler 137 may be distributed across a plurality of environments, computers, or data stores, without departing from the scope of the disclosure. Job scheduler 137 may be proprietary, off-the-shelf, customized, or any other type of job scheduler. Moreover, enterprise 100 may purchase, download, or otherwise obtain job scheduler 137 using any appropriate technique.

Figure 2A:
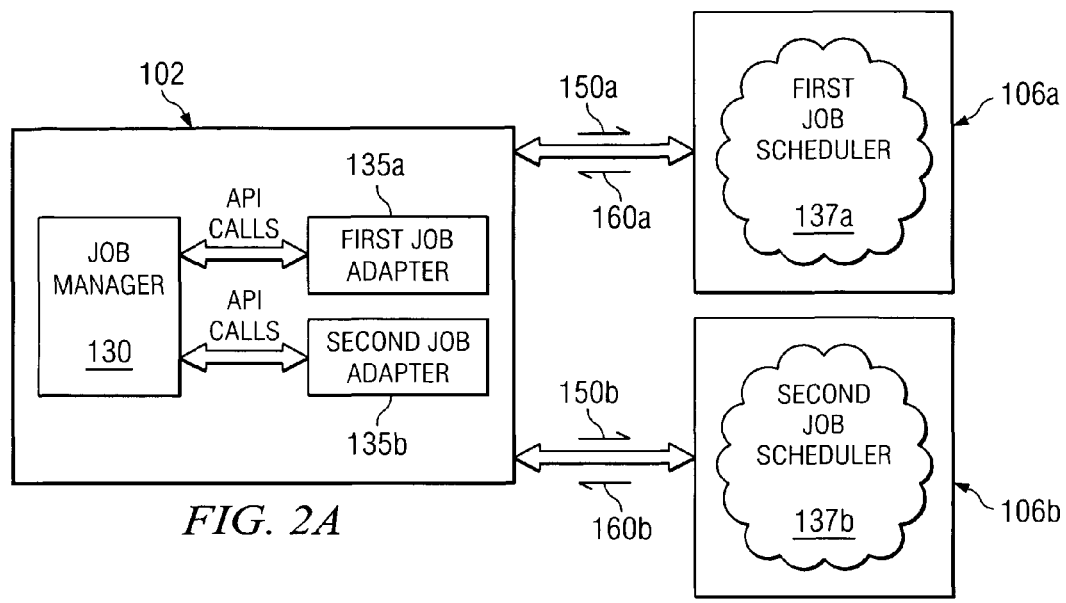
FIGS. 2A-E illustrate various configurations of an enterprise system for executing jobs in heterogeneous operating environments.
Figure 2B:
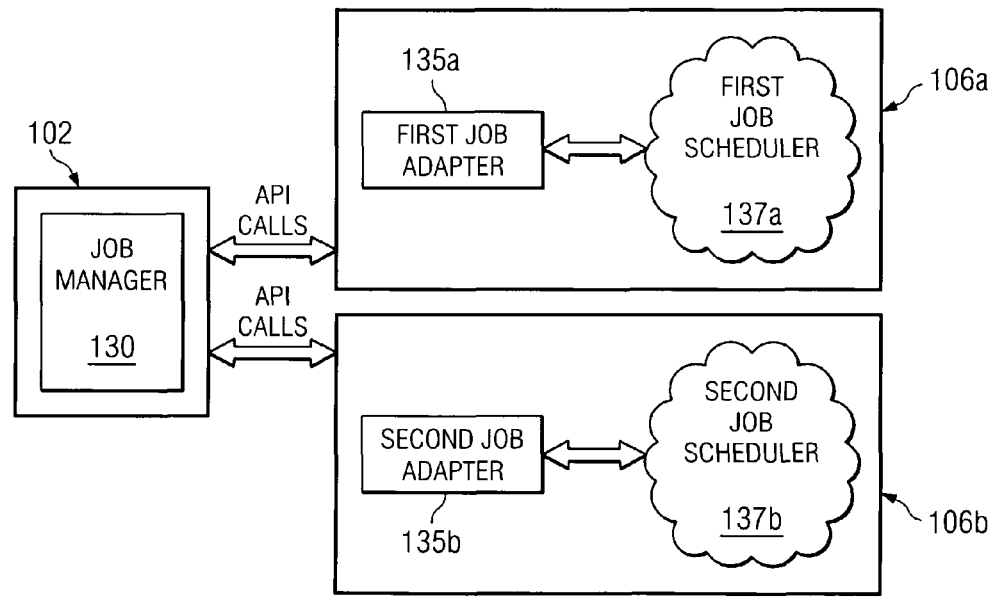

For example, FIGS. 2A-E illustrates at least a portion of system 100 that includes server 102 communicably coupled to first and second operating environments 106. In this example, each operating environment 106 includes one job scheduler 137, each operable to manage jobs 150 for that particular operating environment 106. Job manager 130, illustrated as executing on server 102, is communicably coupled to first job scheduler 137a through a first adapter 135a and to second job scheduler 137b through a second adapter 135b. But, as illustrated in the respective figures, adapters 135 may reside on server 102 and/or the associated operating environment 106 as appropriate. For example, as illustrated in FIG. 2A, job manager 130 locally includes, loads, or otherwise invokes adapter 135a for executing job 150a, receiving or retrieving job status 160a, or other communications, commands, instructions, and such to first job scheduler 135a. In another example, as illustrated in FIG. 2B, one or more of the adapters 135 may act as an agent, service, or daemon residing within the operating environment 106 for the appropriate job scheduler 137. In this example, job manager 130 may invoke or interact with remote adapter 135 using a particular port, socket, or method. In yet another embodiment, illustrated in FIG. 2D, job manager 130 may include one of the job schedulers 137 operable to schedule heterogeneous jobs 150 to a plurality of operating environments 106. In this embodiment, job manager 130 may be considered a logical all-in-one module with internal job scheduling, adapting, and normalizing processes and capabilities.

Figure 2C:
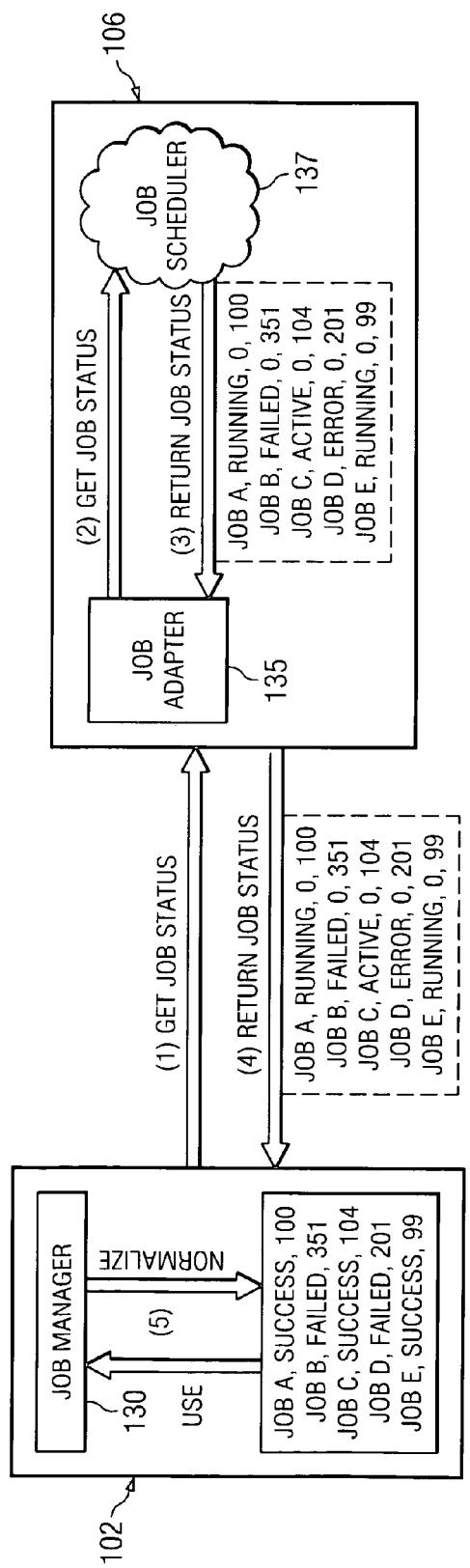
Figure 2D:
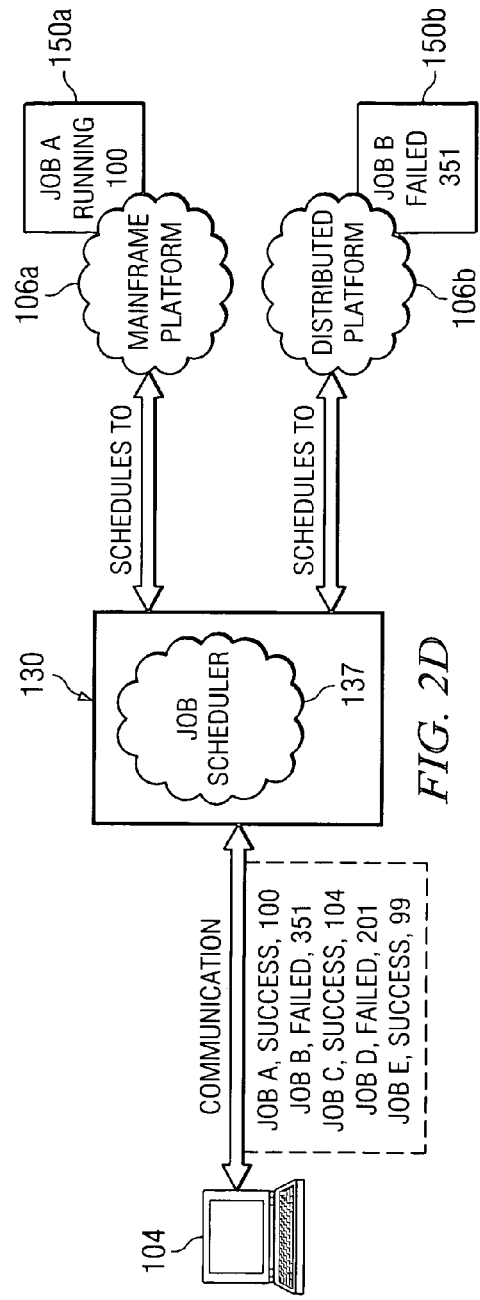
Figure 2E:
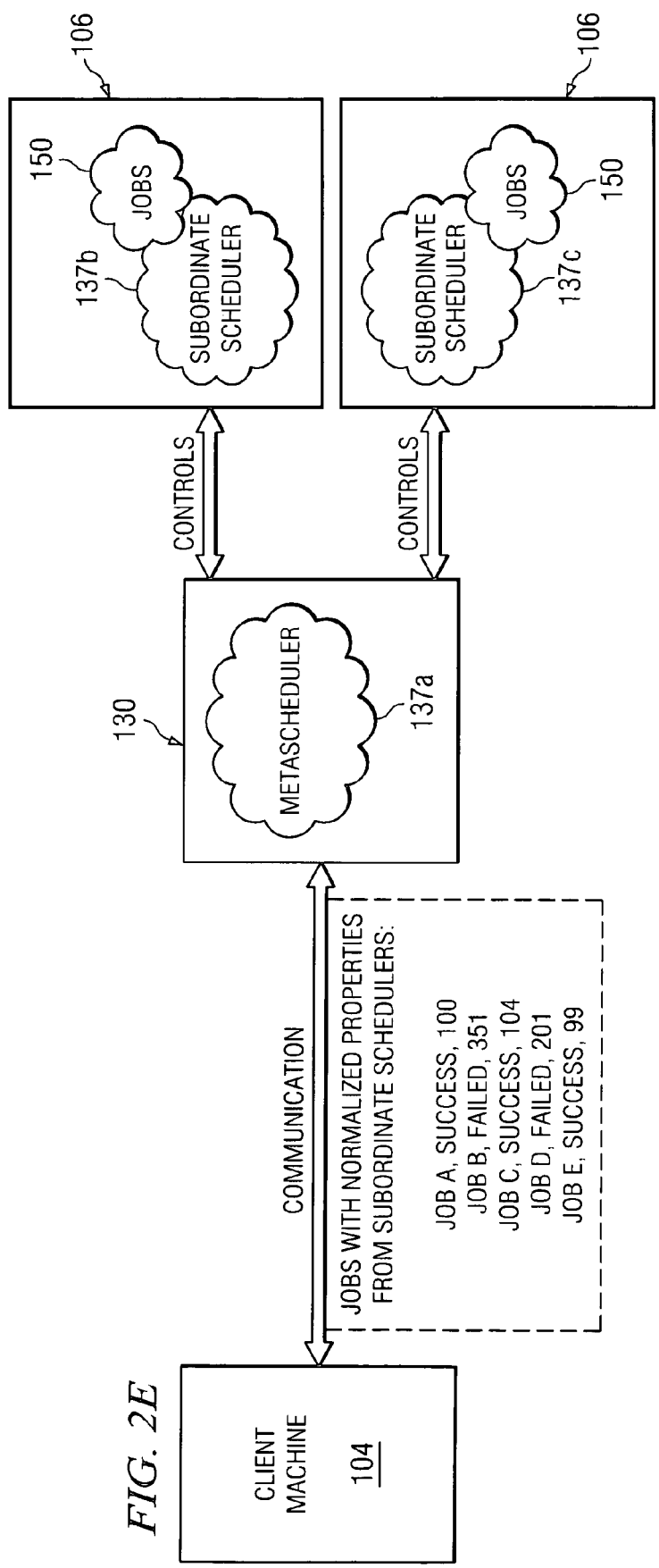

As illustrated in FIG. 2E, a particular job scheduler 137 or other application (job manager 130 or other non-illustrated application) may be designed or implemented as a "metascheduler" (137a) that caters to more than one type of job 150 or is compatible with more than one operating environment 106. In this scenario, job scheduler 137a can manage heterogeneous jobs on different platforms, operating systems, or other environments 106. When job scheduler 137a provides the information about such jobs, it may automatically normalize the properties of these jobs. As illustrated, the "metascheduler" 137a could also control subordinate schedulers 137b and 137c, respectively. "Metascheduler" 137a may be operable to consolidate and normalize the information obtained from the subordinates 137b and 137c as appropriate.

In one aspect of operation, illustrated in example FIG. 2C, when retrieving the details or properties of jobs, adapter 135 communicates with job scheduler 137 to get the raw values of these job properties. After adapter 135 receives the information, it then translates and normalizes certain properties into a common set of values. In particular, the status property of job 150 is mapped from the set of job scheduler-specific values into a common or customized set of values. In some cases, more than one raw value may be used to map to the common set of values. For example, a mainframe job may include three properties that determine the normalized job status value. These example properties are: queue name, status and specific status. In this example, the raw values are used in combination to map to a common normalized value.

| Normalized Value | Mainframe Raw Value (Queue/Status/Specific Status) | Windows/Unix Raw Value |
|---|---|---|
| Running | ACT/any status except WARN/any specific status | Running |
| Waiting | REQ/any status except WARN or ERRX/any specific status except RESTART RDY/any status except WARN/any specific status | Starting, Inactive, Activated, Queue Wait |
| Success | CMP/any status except CANCEL/any specific status | Success |
| Failure | REQ/ERRX/any specific status REQ/any status/RESTART | Failure |
| Cancel | CMP/CANCEL/any specific status | Terminated |
| Restart | | Late to Start |

-continued

| Normalized Value | Mainframe Raw Value (Queue/Status/Specific Status) | Windows/Unix Raw Value |
| --- | --- | --- |
| On Hold | REQ/WARN/HOLD | Hold |
| Late to Start | REQ/WARN/any specific status RDY/WARN/any specific status | |
| Running Late | ACT/WARN/any specific status | |
| Inactive | FOR/any status/any specific status | |
| Unknown | other values or combinations | other values |

In other words, the normalization of job properties can also be performed in job manager 130 instead of the associated adapter 135. Indeed, an example Job Status Console of GUI 166 may also be operable to normalize of the status property of the jobs. That is, adapter 135 may perform no normalizing translation when the raw data is retrieved from the job scheduler 137. This information is then returned to the caller, which is job manager 130 or GUI 116 as appropriate. The calling application then normalizes the job properties using, for example, a technique of mapping the raw values into a set of common values using normalization policies 145.

Figure 3:
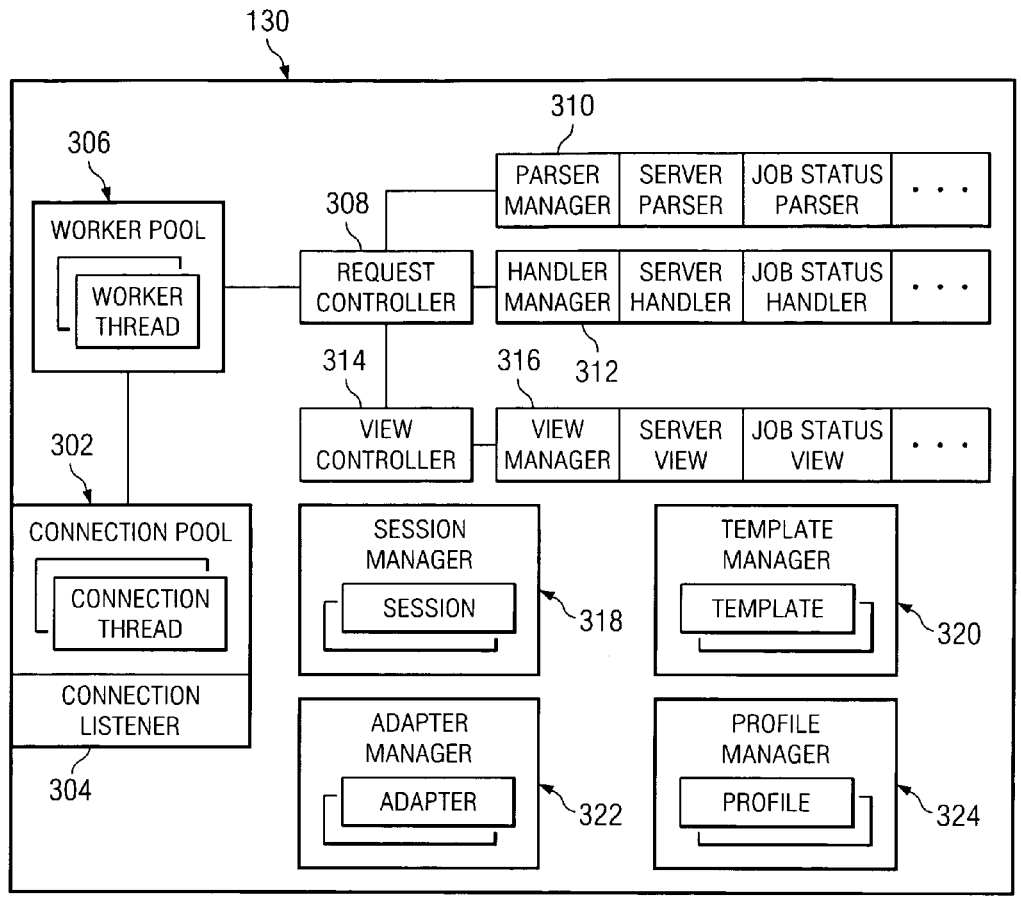
FIG. 3 illustrates one embodiment of the job manager of FIG. 1.

FIG. 3 illustrates one embodiment of the job manager 130. At a high level, this embodiment of job manager 130 includes a connection listener 304, a request controller 308 communicably coupled with a plurality of job parsers and managers, a view controller 314, a session manager 318, a template manager 320, an adapter manager 322, and a profile manager 324. But, of course, these sub-modules are for example purposes only and job manager 130 may include none, some, or all of (as well as other) the illustrated sub-modules. Moreover, one or more of the sub-modules may be remote, dynamically linked, or invoked as appropriate.

Connection listener 304 is any module, library, object, or other process operable to listen (such as on a known port(s)) for connections from clients 104. For example, connection listener 304 may include or implement the following example properties:

| Name | Description |
| --- | --- |
| portList | List of server ports |
| serverSocketList | List of server sockets |
| connectionThreadManager | Connection thread manager |

Connection listener 304 may also execute or invoke the following example methods:

| Name | Description |
| --- | --- |
| void init( ) | Initialize the server listener |
| void destroy( ) | Destroy the server listener |
| void addPort(int portNumber) | Add a listener port |
| void removePort(int portNumber) | Remove a listener port |

Connection listener 304 may include or be communicably coupled with connection pool 302. Connection pool 302 may be any thread manager module or data structure operable to dispatch outgoing messages to the connection threads for processing. In certain embodiments, connection pool 302 is at least partially responsible for maintaining connection threads for communications between job manager 130 and clients 104. The following table shows example properties of connection pool 302:

| Name | Description |
| --- | --- |
| threadList | List of connection threads |
| workerPool | Worker pool |

And the following table shows example methods of the connection pool:

| Name | Description |
| --- | --- |
| void init( ) | Initialize the manager |
| void destroy( ) | Destroy the manager |
| void addConnection(Socket socket) | Add a new socket connection and instantiate a connection thread to handle it |
| void destroyConnection(Socket socket) | Destroy the socket connection thread |
| void sendMessage (ResponseMessage msg) | Send a message to the first available connection |

After a connection is established, it is assigned to a connection thread in the connection pool, for processing communications. Generally, a connection thread manages a particular connection. For example, the connection may be keyed on or assigned a socket. For example, when an outgoing message is to be sent out, the thread sends the message through the connection using the appropriate socket. When an incoming request is received from client 104, the thread reads the message and unpacks it into a message object. This object is then handed off to the worker pool 306 for processing.

Worker pool 306 is any object or data structure representing the pool of worker threads. Generally, each worker thread object represents a thread that can perform a particular task. For example, the worker thread may accept a unit of work and perform or execute it. When the task is completed, the worker is typically released back into worker pool 306. Worker threads are handed out to perform tasks on behalf of client 104. In certain embodiments, worker pool 306 can be configured to start with a particular number of threads and automatically grow to handle higher loads as necessary. Worker pool 306 may include the following example properties:

| Name | Description |
| --- | --- |
| workerThreadList | List of worker threads |
| connectionPool | Connection pool | and implement the following example method:

| Name | Description |
| --- | --- |
| void process( RequestMessage message) | Process the given request message |

Illustrated worker pool 306 is communicably coupled with request controller 308.

Request controller 308 is any module, object, or other process operable to route incoming messages to the appropriate objects 310 and 312. For example, the message may first be sent to the appropriate parser object 310 so that the message may be parsed into a request object. There may be many kinds of request objects, such as one for each type of request. For example, the following table illustrates a number of example request objects:

| Type | Parameter | Description |
|---|---|---|
| Server Connect | server | Name of server |
|  | user | User name credential |
|  | password | Password credential |
| Server Disconnect | server | Name of server |
| Get Job Status | server | Name of server |
|  | view | Name of job status view |
| Scroll Job Status | view | Name of job status view |
|  | scroll size | Scrolling size |
|  | scroll direction | Direction (forward or back) |
| Sort Job Status | view | Name of job status view |
|  | property | Which property to scroll by |
|  | direction | Ascending or descending |
| Save Job Status | view | Name of job status view |
|  | old view name | Previous name of job status view (if any) |
|  | other parameters | Other configuration parameters |
| Delete Job Status | view | Name of job status view |
| Get Job Details | job name | Name of job |
|  | server | Server name |
|  | job number | Job number |
|  | job properties | Other job parameters |
| Update Job Details | job name | Name of job |
|  | server | Server name |
|  | job number | Job number |
|  | job properties | Other job parameters |
| Job Action | job name | Name of job |
|  | server | Server name |
|  | job number | Job number |
|  | job properties | Other job parameters |
|  | action properties | Action parameters |
| Get Run Log | server | Server name |
|  | view | View name |
| Save Run Log | view | View name |
|  | old view name | Previous name of run log view, if any |
| Delete Run Log | view | Delete the run log view |
| Get Prior Run | server | Server name |
|  | view | View name |
| Save Prior Run | view | View name |
|  | old view name | Previous name of prior run view, if any |
| Delete Prior Run | view | Delete the prior run view |
| Get Alerts | server | Server name |
|  | view | View name |
| Update Alerts | server | Server name |
|  | view | View name |
|  | alert properties | Alert properties |
|  | filter properties | Filter properties |
| Alert Action | alert properties | Alert properties |
|  | action parameters | Parameters to alert action |
| Get Dashboard | server | Server name |
|  | view | View name |
| Update Dashboard | server | Server name |
|  | view | View name |
|  | dashboard properties | Dashboard properties |
|  | filter properties | Filter properties |
| Open session |  | Create new session |
| Close session | session ID | Destroy session |

In certain embodiments, the request object encapsulates data pertinent to the request, including ID, session, request param eters, and more. For example, the request object may have the following properties:

| Name | Description |
|---|---|
| requestId | Request ID |
| session | Session |
| response | Response to this request, if any |

Each request object may implement or invoke the following example methods:

| Name | Description |
|---|---|
| int getRequestId( ) | Returns the request ID |
| void setRequestId( int id ) | Sets the request ID |
| Session getSession( ) | Returns the session |
| void setSession( Session session ) | Sets the session |
| IResponse getResponse( ) | Returns the response associated with this request, if any |
| void setResponse( IResponse response ) | Sets the response |

Based on the incoming message's request ID, a parser manager provides the appropriate parser object 310 to unpack the message into the request object. Parser object 310 is then invoked to unpack the message. It will be understood that there may be any number of parser objects 310, such as one for each type of request. For example, the parser manager may include or be coupled with one or more of the following example parser objects 310:

| Name | Description |
|---|---|
| JobStatusParser | Parses requests pertaining to job status |
| JobDetailsParser | Parses requests pertaining to job details |
| JobActionsParser | Parses requests pertaining to job actions |
| ServerParser | Parses requests pertaining to server actions |
| OEParser | Parses requests pertaining to operating environment specific objects |
| AlertParser | Parses requests pertaining to alerts |
| DashboardParser | Parses requests pertaining to dashboard |
| SessionParser | Parses requests pertaining to session |

These example parser objects 310 may implement, execute, or produce the following request messages:

| Parser | Request Message |
|---|---|
| JobStatusParser | Get Job Status |
|  | Scroll Job Status |
|  | Sort Job Status |
|  | Save Job Status |
|  | Delete Job Status |
| JobDetailsParser | Get Job Details |
|  | Update Job Details |
| JobActionsParser | Job Action |
| ServerParser | Server Connect |
|  | Server Disconnect |
| CA7Parser | Get Run Log |
|  | Save Run Log |
|  | Delete Run Log |
|  | Get Prior Run |
|  | Save Prior Run |
|  | Delete Prior Run |

| Parser | Request Message |
|---|---|
| AlertParser | Get Alerts |
| | Update Alerts |
| | Alert Action |
| DashboardParser | Get Dashboard |
| | Update Dashboard |
| SessionParser | Open Session |
| | Close Session |

After the request object is produced by parser object 310, the request is routed to one of the handler objects 312 for subsequent processing. The handler manager processes a request object, which often includes the object ID. Based on the request object ID and other information, the handler manager routes the request object to the correct handler object 312. Each handler 312 is responsible for processing the request using operating environment 106, adapters 135, and job schedulers 137 as appropriate. As with parser objects 310, there are typically many handler objects 312, such as one for each type of request. In certain embodiments, each handler 312 is responsible for performing or requesting the work that is requested. For example, each handler may be operable to load, invoke, or communicate with the appropriate adapter 135 based on the request object. As a result of its processing, a response object is produced. This response object is returned along with the request object, after processing (typically through adapter 135). The following table shows an example list of handlers 312:

| Name | Description |
|---|---|
| JobStatusHandler | Processes requests pertaining to job status |
| JobHandler | Processes requests pertaining to job details |
| JobHandler | Processes requests pertaining to job actions |
| ServerHandler | Processes requests pertaining to server actions |
| OEHandler | Processes requests pertaining to OE specific objects |
| AlertHandler | Processes requests pertaining to alerts |
| DashboardHandler | Processes requests pertaining to dashboard |
| SessionHandler | Processes requests pertaining to the session |

The following table maps requests to example handlers:

| Handler | Request |
|---|---|
| JobStatusHandler | Get Job Status |
| | Scroll Job Status |
| | Sort Job Status |
| | Save Job Status |
| | Delete Job Status |
| JobHandler | Get Job Details |
| | Update Job Details |
| | Job Action |
| OEHandler | Get Run Log |
| | Save Run Log |
| | Delete Run Log |
| | Get Prior Run |
| | Save Prior Run |
| | Delete Prior Run |
| AlertHandler | Get Alerts |
| | Update Alerts |
| | Alert Action |
| DashboardHandler | Get Dashboard |
| | Update Dashboard |
| SessionHandler | Open session |
| | Close session |

As described above, the processing by each handler object 312 results in a response object. This example response object is then fed into view controller 314 to produce the response that, in turn, is returned as the outgoing message to client 104.

View controller 314 routes a processed request object (along with its response object, if any) to the correct objects. First, the request is fed to a view manager, which is operable to generate a view for use by GUI 116. The view manager provides, calls, or other executes view handlers to process requests into views. For example, it may route the request to the correct view handler. There are any number of handler objects, such as one for each type of view.

| Name | Description |
|---|---|
| JobStatusHandler | Processes responses pertaining to job status |
| JobDetailsHandler | Processes responses pertaining to job details |
| JobActionsHandler | Processes responses pertaining to job actions |
| ServerHandler | Processes responses pertaining to server actions |
| CA7Handler | Processes responses pertaining to CA-7 specific objects |
| AlertHandler | Processes responses pertaining to alerts |
| DashboardHandler | Processes responses pertaining to dashboard |

The view manager is responsible for processing the given request into an end-user view. As a result of its processing, a view object is produced or updated. This view object is returned along with the request object after processing. After the view is produced, the response object is then sent back to client 104. It will be understood that the response object may comprise any particular data or instruction in any suitable format. There may be any number of types or sub-classes of response objects. For example,

| Type | Property | Description |
|---|---|---|
| Server Connect | | |
| Server Disconnect | | |
| Get Job Status | jobStatus | Job Status object |
| Scroll Job Status | jobStatus | Job Status object |
| Sort Job Status | jobStatus | Job Status object |
| Save Job Status | jobStatus | Job Status object |
| Delete Job Status | | |
| Get Job Details | job | Job object |
| Update Job Details | job | Job object |
| Job Action | job | Job object |
| | action returns | Other action return values |
| Get Run Log | RunLog | Run Log object |
| Save Run Log | RunLog | Run Log object |
| Delete Run Log | | |
| Get Prior Run | PriorRun | Prior Run object |
| Save Prior Run | PriorRun | Prior Run object |
| Get Alerts | alerts | Alerts object |
| Update Alerts | alerts | Alerts object |
| Alert Action | alert | Alert object |
| | action returns | Other action return values |
| Get Dashboard | dashboard | Dashboard object |
| Update.Dashboard | dashboard | Dashboard object |
| Open session | session | Session object |

In certain embodiments, the response object encapsulates most or all of the data pertinent to the response, such as output information, errors, and more. This response object may include some or all of the following example properties:

| Name | Description |
|---|---|
| request | Request associated with this response, if any |

-continued

| Name | Description |
|---|---|
| buffer | Buffer containing response |
| exception | Exception, if any |
| errorMessage | Error message, if any |
| errorCode | Error code, if any |

Moreover, in certain embodiments, the response object may include the following example methods:

| Name | Description |
|---|---|
| IRequest getRequest( ) | Returns the request associated with this response |
| void setRequest( IRequest request ) | Sets the request |
| StringBuffer getBuffer( ) | Returns the response buffer |
| void setBuffer( StringBuffer buffer ) | Sets the response buffer |

Illustrated job manager 130 also includes session manager 318. In this embodiment, session manager 318 is any module generally responsible for handling sessions. In other words, it creates, stores, and destroys sessions that are assigned to each unique client 104, often utilizing a map of the current sessions. The session typically maintains persistent information for a unique client 104 for the lifetime of the connection. Certain back-end objects specific to client 104 are stored and reachable from the client's session. In certain embodiments, session manager 318 implements the following example methods:

| Name | Description |
|---|---|
| Session createSession( ) | Creates a new session |
| void destroySession( Session session ) | Destroy the given session |
| Session findSession( String sessionId ) | Return the session that matches the given session ID, if any |
| void init( ) | Initialize the session manager |
| void destroy( ) | Destroy the session manager |

Session manager 318 may automatically cull inactive or abandoned sessions that exceed a timeout period. For example, certain sessions are governed by an idle timeout. If this session is kept idle beyond a configurable timeout period, then session manager 318 may clean it up automatically. In this example, all objects—views, models, adapters, etc.—associated with the session are destroyed. A next request by the user may result in an error indicating an unknown session or bad session. But, if the view is dynamic, then the view may be responsible for sending the timeout event at the point where the manager cleans up the session (and its views).

Template manager 320 may be any module operable to manage templates, which are generally stored as objects in HTML files with placeholder variables representing dynamic sections. But in certain circumstances, templates may not be complete <html> blocks. Some may represent small sections of a complete page such as a frame, table, graph, etc. At runtime, the component sections are typically replaced by the actual data. Template objects are identified by their file names. Since they are often uniquely named on the file system, there may be no need to invent a new tagging scheme to identify them. Once requested, executed, or otherwise located, a transformation of the template yields the output that is returned to the user through GUI 116. During startup, initialization, or at any other appropriate time, job manager 130 reads in or loads the desired templates. Templates are often preprocessed after they are read from the file system. Each template may be encapsulated inside an object that uses a vector. Each entry in the vector contains an internal object that is either a static portion of the template or a dynamic portion represented by a variable name. When the entries are traversed in order and printed out, the resulting output resembles the template file. This process may be called printing. The template object exposes the printing functionality with a parameter. The caller provides a map that contains variable names and values as its parameter. When the template object encounters a variable name in the vector while printing, it uses the map to resolve the variable name into a value. That value is then printed in lieu of the variable; otherwise, the variable may be deemed empty. Sometimes, template manager 320 executes code in response to a variable entry in the vector. The caller can register callbacks with the object for this scenario. Callbacks can be registered for specific variable name, index number, or all variables. Parameters to a callback include the current vector entry and working buffer of the printing process. Template manager 320 hands these objects out to transformers as necessary. Transformers can use the same template object simultaneously. In this scenario, the template object is responsible for safely supporting multiple callers.

Adapter manager 322 is responsible for handling adapter wrappers, often utilizing a map of adapters. The adapter wrapper encapsulates a local or back-end adapter 135. By providing a high-level interface layer on top of each adapter 135, the wrapper provides a consistent and semantic set of methods to each type of job scheduler. Typically, adapter manager 322 creates, stores, and destroys wrappers that are assigned to each unique back-end connection or environment 106. In certain embodiments, adapter manager 322 implements the following example methods:

| Name | Description |
|---|---|
| AdapterWrapper getAdapter( String server ) | Creates or returns the adapter wrapper for this server |
| void init( ) | Initialize the adapter manager |
| void destroy( ) | Destroy the adapter manager |

Profile manager 324 is responsible for handling profile objects such as, for example, servers, users, groups and views. In this example, the server profile object encapsulates a configured server, the user profile object encapsulates a user record, the group profile object encapsulates a Portal group record, and the view profile object encapsulates a view record. The profile manager 324 communicates with configuration, Portal, and its own data store to create, update and delete these objects. In certain embodiments, profile manager 324 includes the following example methods:

| Name | Description |
|---|---|
| ServerProfile getServer (String serverName ) | Returns the server profile matching the given name |
| UserProfile getUser(String userName ) | Returns the user profile matching the given name |
| GroupProfile getGroup (String groupName ) | Returns the group profile matching the given name |
| ViewProfile getView | Returns the view profile matching the given |

| Name | Description |
| --- | --- |
| (String userName, String viewName ) | name, that is accessible to the user |
| List getServers( ) | Returns the list of servers |
| List getUsers( ) | Returns the list of users |
| List getGroups( ) | Returns the list of groups |
| List getViews(String username ) | Returns the list of views that are accessible to the user |

It will be understood that the foregoing sub-modules, properties, and methods are for illustration purposes only. Indeed, each of these sub-modules, properties, and methods may or may not be present in certain job managers 130. Put another way, job manager 130 includes any processes or data storage operable manage jobs 150 and may include none, some, or all of the foregoing example embodiments without departing from the scope of the disclosure.

In one aspect of operation, a flow describes a path of execution of a client request through job manager 130. The request typically originates from GUI 116 and results in a new or updated page that is returned to the browser. When the servlet receives a request, it is routed the request controller 308. This controller 308 produces a request object that encapsulates the HTTP request and response. Request controller 308 then forwards this object to parser manager 310. Parser manager 310 is comprised of one or more parsers. Each parser inspects the request and breaks it down into various pieces of information as appropriate. For example, the session ID and request ID are extracted. The parser may use this information to look up objects that are relevant to the request. For example, the session ID translates to a session object. When control returns to request controller 308 from the parser, the request object is forwarded to handler manager 312.

Handler manager 312 is comprised of one or more handlers. Based on information in the request object such as the request ID, handler manager 312 forwards the request to the corresponding handler. Each handler may be considered an "atomic" piece of business logic dedicated to servicing a request. A handler often depends on other objects to accomplish its work. Some of these objects include adapters 135, model objects, and other manager objects. For example, when a job status handler executes, it uses the correct adapter instance 135 in conjunction with the job status model object to accomplish its work. When the handler finishes its work, it produces a response object. A response object can contain different pieces of information such as output data, error codes, and others. Handler manager 312 returns this response object to request controller 308.

Request controller 308 forwards the response object to view controller 314. View controller 314 is comprised of one or more view objects. Each object is dedicated to producing a specific view such as job status. The job status response object provides the information to the view to produce the output for the browser. Views are normally closely tied to templates. Template manager 320 provides HTML templates that form the basis for the output. The final output is a combination of data from a response object and a template. After the output is composed, view controller 314 sends it to client 104. Control then returns to request controller 308 and out of the servlet.

Figure 4A:
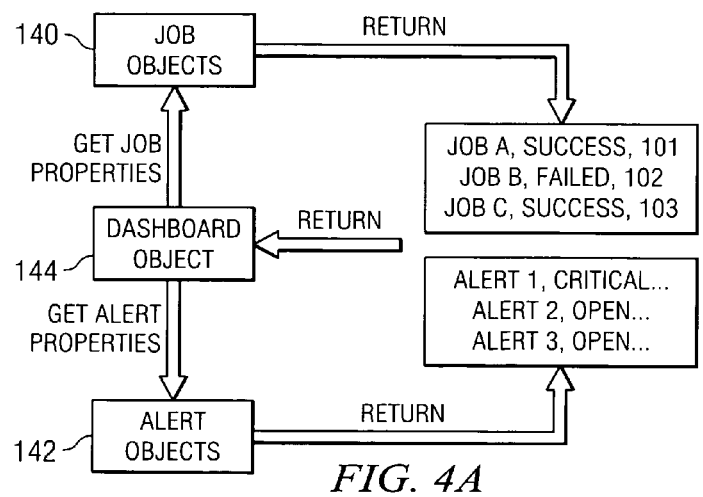
FIGS. 4A-C illustrates the heterogeneous job dashboard system of FIG. 1 operating in accordance with one embodiment of the present disclosure.
Figure 4B:
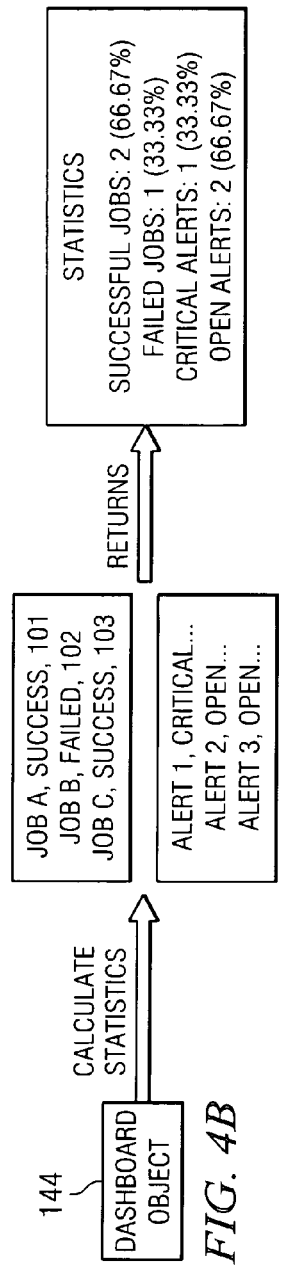
Figure 4C:
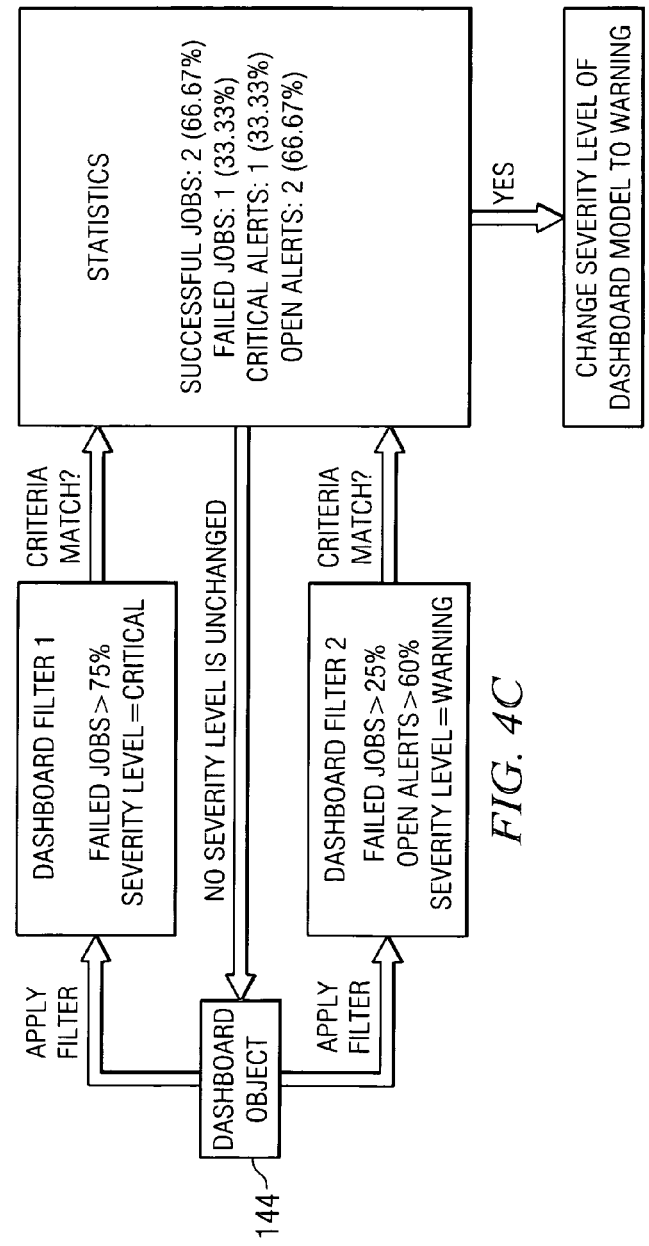

FIGS. 4A-C illustrates the heterogeneous job dashboard system 100 of FIG. 1 operating in accordance with one embodiment of the present disclosure. Referring to FIG. 4A, dashboard object 144 retrieves or otherwise identifies properties of job objects 140 and alert objects 142. As discussed above, job objects 140 and alert objects 142 may represent jobs and alerts from heterogeneous operating environments 106. To facilitate the summarization process, job manager 130 may normalize job properties and alert properties prior to generating job objects 140 and alert objects 142 by referring to normalization policies. In the case that the job properties and alert properties are not normalized prior to generating job objects 140 and alert objects 142, dashboard object 144 may normalize or invoke job manager 130 to normalize the identified job properties and alert properties prior to processing the properties.

Referring to FIG. 4B, dashboard object 144 then processes the identified properties. In the illustrated embodiment, dashboard object 144 determines statistical information using the identified properties. Initially, dashboard object 144 determines a total number of jobs, a total number of alerts, a count of each job state, and a count of each alert state. As discussed above, system 100 may process identified properties in any other suitable manner in order to provide a summary of the user group. In the illustrated embodiment, dashboard object 144 determines a total of three jobs, a total of three alerts, a count of three success job states, a count of one failed job states, a count of one critical alert state, and a count of two open alert states. It will be understood that the illustrated properties are for illustration purposes only and system 100 may process some, none, all, or different properties without deviating from the scope of this disclosure. After determining these metrics, dashboard object 144 generates statistical information using the totals and counts. In the illustrated embodiment, dashboard object 144 determines a percentage of each job state in accordance with the total number of jobs and a percentage of each alert state in accordance with the total number of alerts. As a result, dashboard object 144 determines that 66.67% of the jobs were successful, 33.33% of the jobs failed, 33.33% of the alerts were critical, and 66.67% of the alerts were open. These results may then be presented to a user of system 100 thereby providing a summary of the user group.

Referring to FIG. 4C, dashboard object 144 determines a severity level of a user group using the statistical information. Initially, dashboard object 144 identifies one or more filters in response to any appropriate event. Dashboard object 144 may identify filters i) periodically; ii) in response to a selection by a user of system 100; iii) in response to determining statistical information; and/or iv) based on any other event. As discussed above, the filter criteria may include one or more operators and one or more associated values that represent how dashboard object 144 is to compare the statistical information. In the illustrated example, portions of the statistical information will be compared with a value to determine if it is greater than that value. More particularly, the filters may be used to determine if one or more job states and/or one or more alert states exceed a threshold such as a specified percentage. In the event that the statistical information matches the filter criteria, dashboard object 144 will assign a severity level in accordance with the filter. Continuing with the illustrated example, dashboard object 144 determines that the statistical information matches dashboard filter 2. The failed job states (33.33%) exceed the failed jobs threshold (25%) and the open alert state (66.67%) exceed the open alert threshold (60%) thus matching dashboard filter 2. As a result of this match, dashboard object 144 assigns or otherwise associates the severity level value "Warning" to the associated user group. The operational aspects of heterogeneous job dashboard system 100 illustrated in FIGS. 4A-C are for illustration purposes only and merely represent an example of the various techniques. In other words, system 100 may perform some, none, or all operational aspects, as well as others, without departing from the scope of this disclosure.

Figure 5:
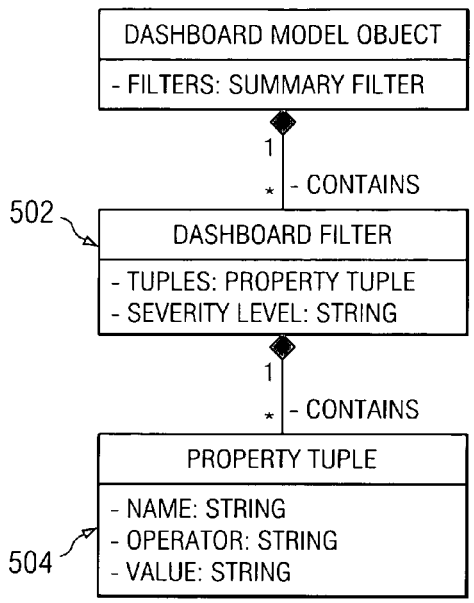
FIG. 5 illustrates an example dashboard object and summary property object in accordance with one embodiment of the present disclosure.

FIG. 5 illustrates an example dashboard object 144 in accordance with one embodiment of the present disclosure. As illustrated, dashboard object 144 may include a number of child records or objects. For example, one record or object (such as a Java dashboard model object) represents a dashboard view for a particular user group of the enterprise. As mentioned above, a user group may include a department, a job type, the entire enterprise, or any other suitable portion of the enterprise. In certain embodiments, each dashboard object 144 contains a collection of dashboard filters 502 and property tuples 504. Dashboard filter 502 represents a particular filter associated with the user group. Dashboard filter 502 may implement the filter using any suitable format and, in response to matching a filter, assign or associate a severity level value to the user group. In the illustrated embodiment, dashboard filter 502 includes at least two values: tuples and severity level. The tuples value identifies one or more property tuples 504. Property tuples 504 may be identified by a name, a directory path, or any other suitable identifier. The severity level value is the value assigned or otherwise associated with a user group in the event that the identified property tuples 504 matches associated statistical information. Property tuple 504 comprises three values: property name, property operator, and property value. The property name contains the name or alias of the property that is matched from job or alert properties or metrics. For example, the name could be "failed jobs" representing the percentage of failed jobs as compared to the total number of jobs. The property operator contains the type comparison to perform on the property value. For example, they operator could be ">" representing the "greater than" comparison. The property value contains the value to match or compare. For example, the value could be "75%." In certain embodiments, property tuple 504 may include multiple property operator's and/or property values. For example, property tuple 504 may include an additional name, operator, and value such as "open alert," ">," and "60%," respectively. The interpretation of the specification of multiple property operators and/or property values in property tuple 504 may require all conditions to be satisfied in order to determine a match with dashboard filter 502.

FIGS. 6A-E are example displays 116a-116e, respectively, for presenting various normalized properties of heterogeneous jobs as executed in accordance with one embodiment of system 100. It will be understood that the illustrated web pages are for example purposes only. Accordingly, GUI 116 may include or present data, such as normalized or raw job properties, in any format or descriptive language and each page may present any appropriate data in any layout without departing from the scope of the disclosure.

Figure 6A:
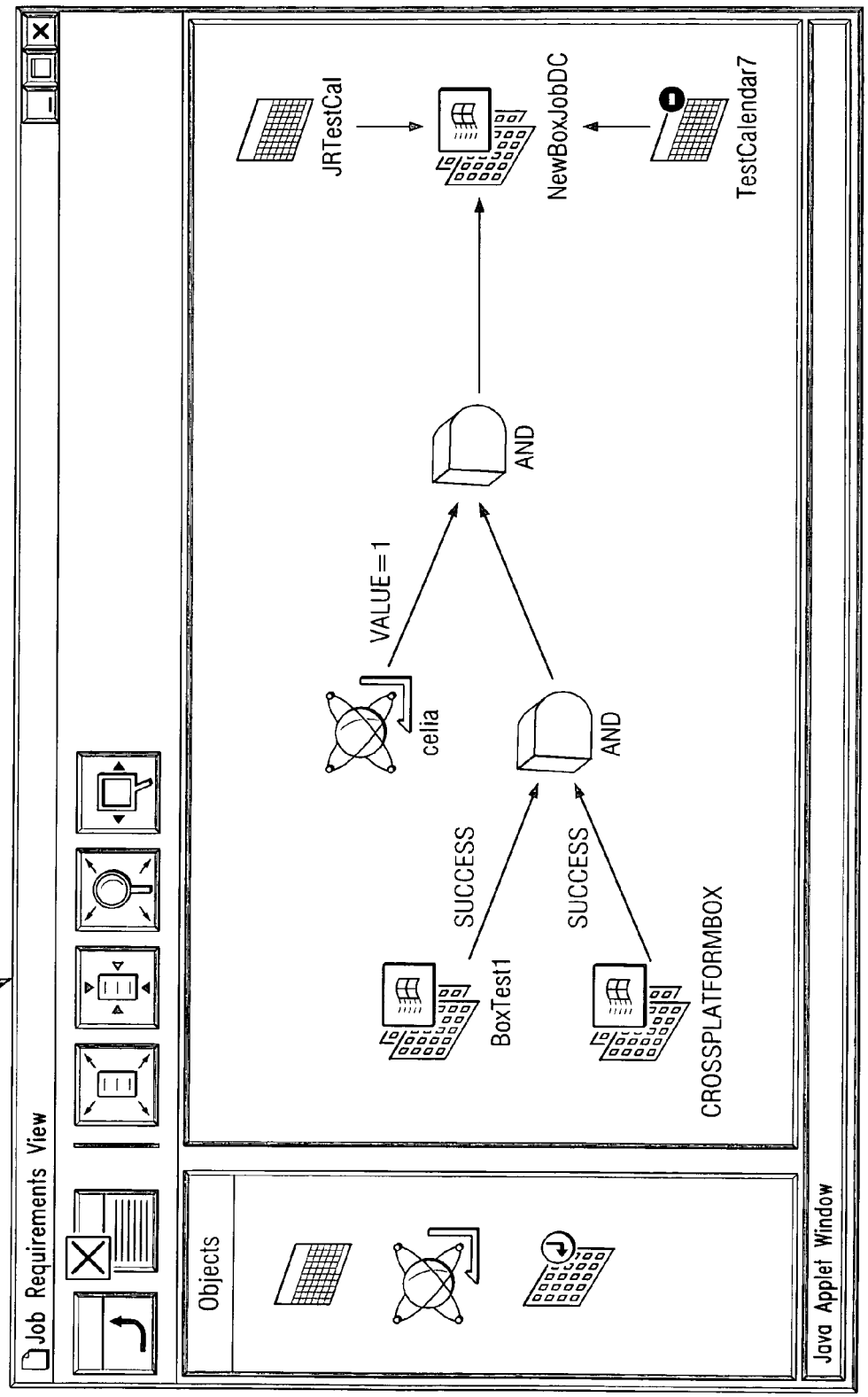
FIGS. 6A-E are example displays for presenting various normalized properties of heterogeneous jobs as executed in the system of FIG. 1 in accordance with one embodiment of the present disclosure.

Turning to the illustrated embodiments, FIG. 6A illustrates an example job requirements or job properties view 116a. In this view 116a, the user may be able to view or modify various properties of job 150 or jobset. In other words, job properties view 116a is a graphical representation of the objects that can be included in the definition of the job. Job objects may include: job predecessor; job successor; triggers; calendar; VRM requirements; dataset predecessors; user requirements; and network predecessors. The dialog may be a modeless frame that contains a context sensitive panel for displaying the graphical view of the selected item's objects. This frame may contain a palette on the left side that has a list of objects that can be created for the selected object. On the right may be the graphical layout of the objects for the selected item. Users may have the option to drag items from the palette and drop them onto the graphical layout. Dragging and dropping an object may create a new object, but the user often fills in the properties for that object in the main view. Upon dropping the object, an icon may appear in the graphical layout. Also, the main view may select the new object and display its properties so the user may fill in any missing attributes. Until the user fills in required properties, all icons representing the new object may have a graphical design that alerts the user that the object is incomplete.

Accordingly, job properties view 116a gives the user the ability to drag existing objects into the job properties view 116a from the main panel's tree view. Job properties view 116a may not allow invalid objects to be dropped and the cursor may change to a "No" symbol to notify the user. When a valid object is dropped, an icon may appear in the job properties view 116 layout and the main view may select the dropped object and display its properties. Job properties view 116a may always be locked onto the object that was selected when it was launched. Users may have the ability to select objects in the main view without job properties view 116a changing. When the user is finished changing the requirements for job 150 or jobset, the applet may provide the option to either close the dialog or change the job properties view 116a's selection to edit another object's requirements. Job properties view 116a may display a blank panel if the user deletes the selected job 150 or jobset from the view. When the user selects an object in job properties view 116a, the main view may select the same object and display its properties.

Figure 6B:
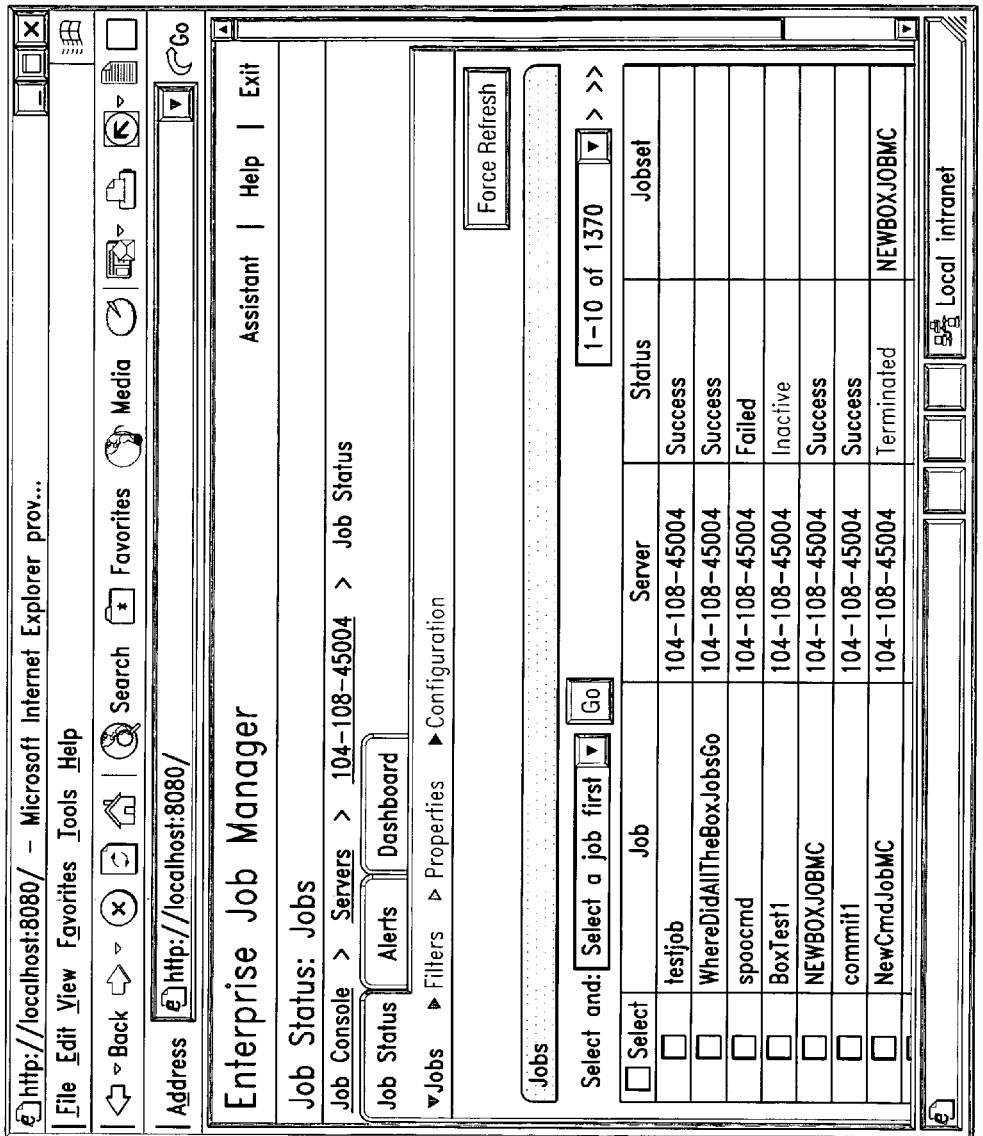

FIG. 6B illustrates an example job status view 116b. In certain embodiments, job status view 116b consolidates the jobs that are filtered for that particular view and displays associated properties. Of course, this view may be customizable across the enterprise or individually. In other words, the particular view may display properties as selected by the user. This view can be sorted by column (or property). The user is also allowed to scroll between sets of jobs when the number of jobs exceeds the window size set for the view. Also, the user is allowed to jump directly into a specific set, the starting set, and the ending set. The order of the properties can also be defined. Often, job status view 116b displays the normalized properties, opposed to the raw data. This allows the user to sort, filter, and otherwise view heterogeneous jobs in a consistent interface. For example, the first two displayed jobs "testjob" and "WhereDidAllTheBoxJobsGo" may be a UNIX job and a mainframe job, respectively. Yet, view 116b presents a common property, "Success," for both jobs after normalizing the native values.

Figure 6C:
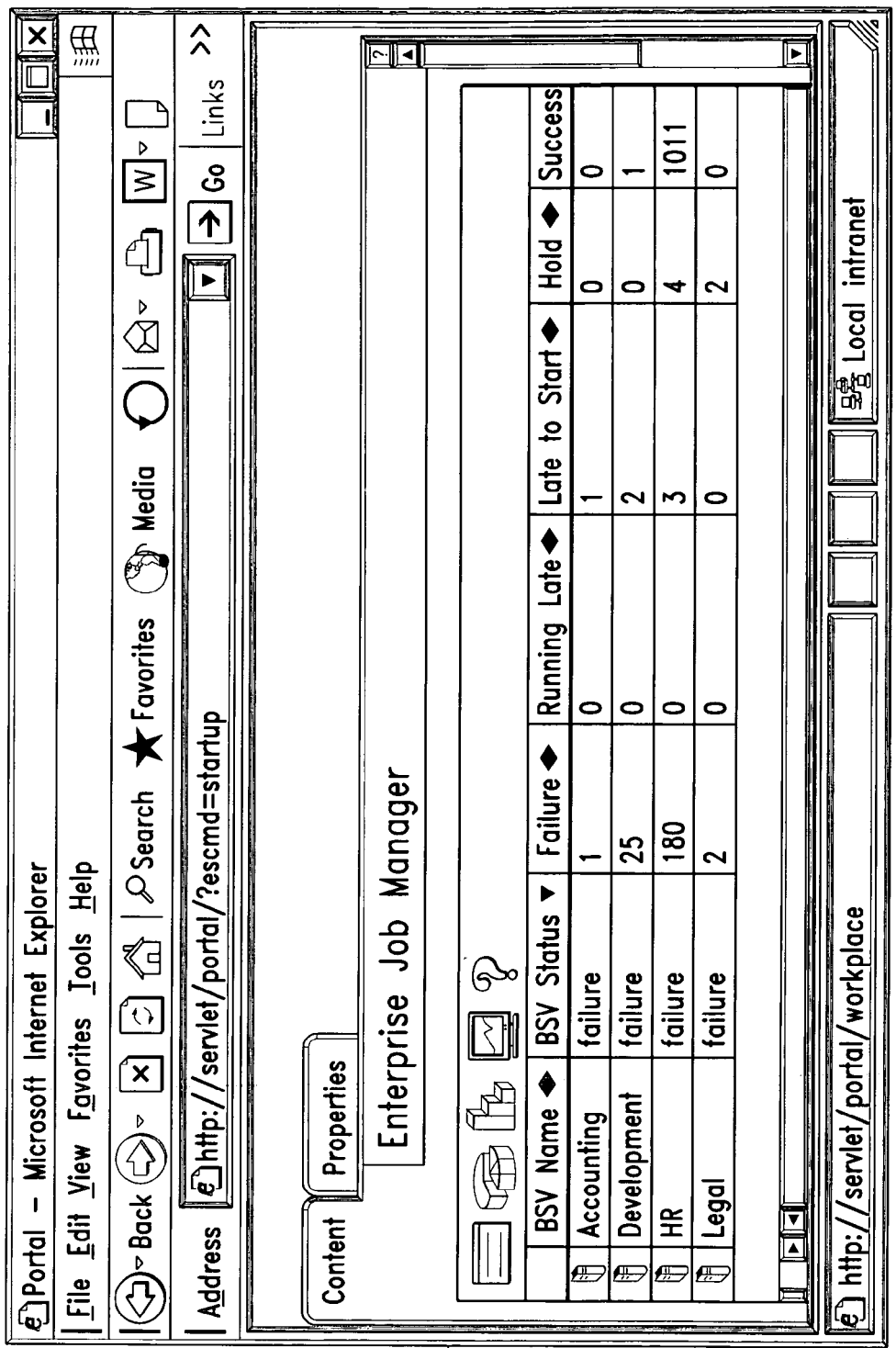

FIG. 6C provides an example overall view 116c of all the various BSVs, to which the particular user has access, in list type view. For each BSV, view 116c shows the number of objects in various pre-defined statuses. When user navigates through rows of the list view by pressing the left mouse button or the up/down arrow keys in the keyboard, the toolbar will show the corresponding enabled icons for the selected BSV. When there is a selected row and user sorts the rows, the toolbar icons will be enabled/disabled according to the newly selected row object after the sort. If user right-clicks any row, a context menu will appear that shows the same enabled menu items, and the toolbar icons will be enabled/disabled accordingly. As with the other views, view 116c may display or process the various properties after appropriate ones have been normalized.

Figure 6D:
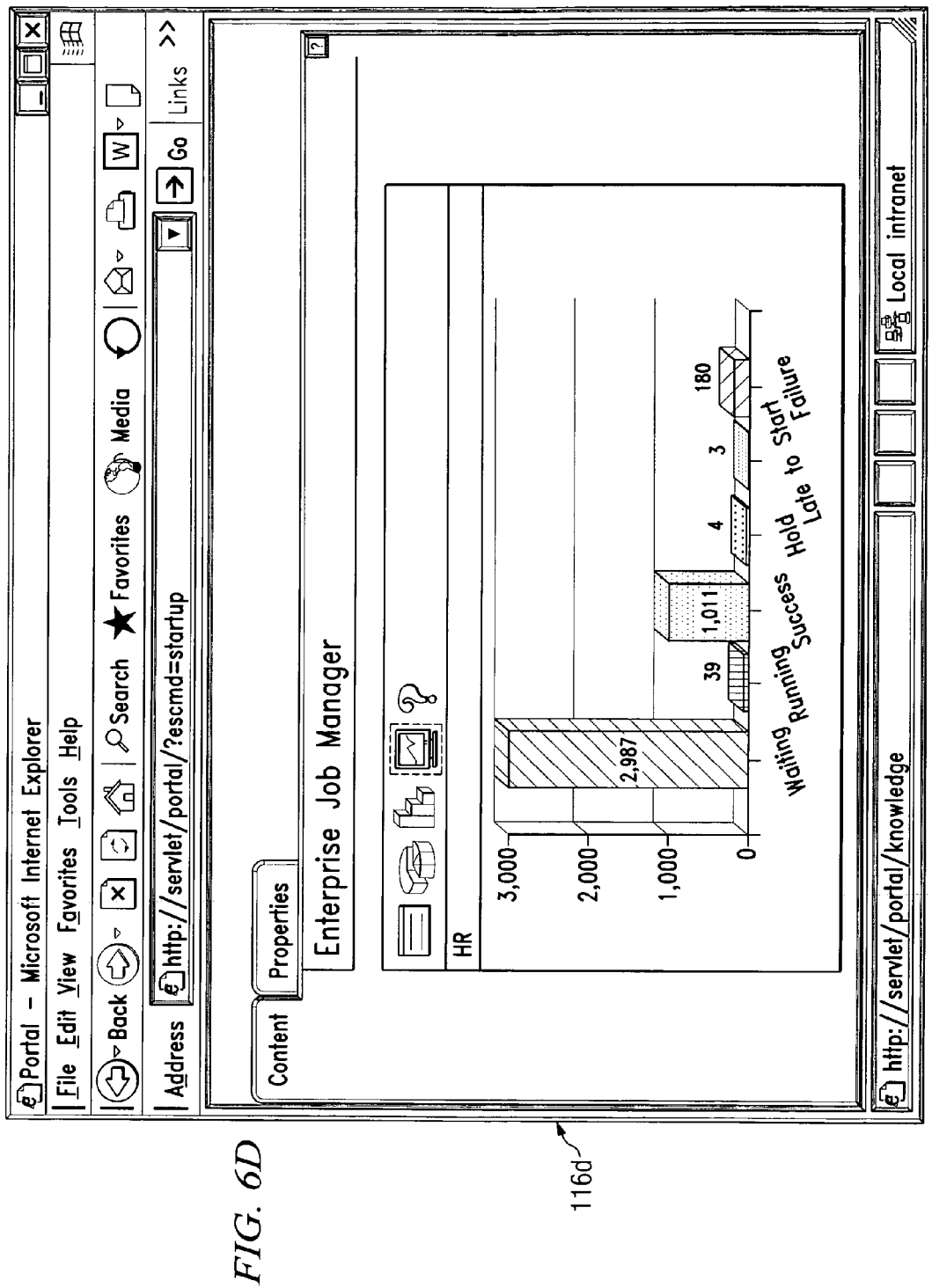
Figure 6E:
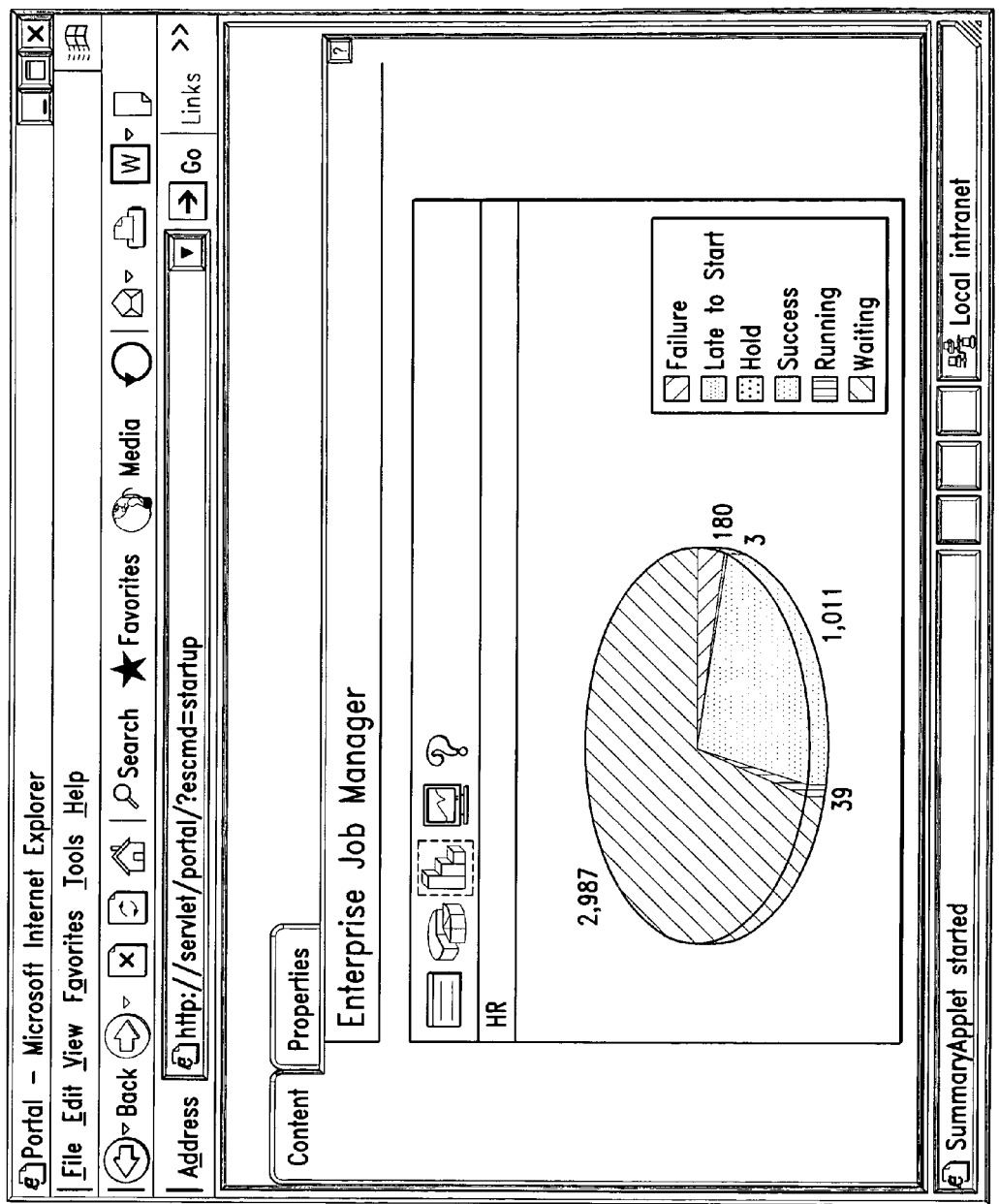

FIGS. 6D and 6E illustrate various graphical or tabular views (116d and 116e) of the various jobs and job properties. For example, the user may select a loaded BSV from the tree, resulting in the BSV details in multiple tabs in the right pane. In this case, this view summarizes the status of the jobs and jobsets included in this BSV and can be displayed as a bar chart or pie chart. These charts show the number of jobs at different status. Each status is represented with a color and this helps in understanding the overall health of the system at a glance. The user can typically switch between these two chart styles using the toolbar option. As with the other views, views 116*d* and 116*e* may each display or process the various properties after appropriate ones have been normalized.

FIGS. 7A-7D are example displays for presenting summaries of a user group of the enterprise in accordance with one embodiment of system 100. As with views 116*a-e*, it will be understood that illustrated web pages 116*f*-116*i* are for example purposes only. Accordingly, GUI 116 may include or present data, such as statistical information of jobs states and alerts states, in any format or descriptive language and each page may present any appropriate data in any suitable layout without departing from the scope of the disclosure.

Figure 7A:
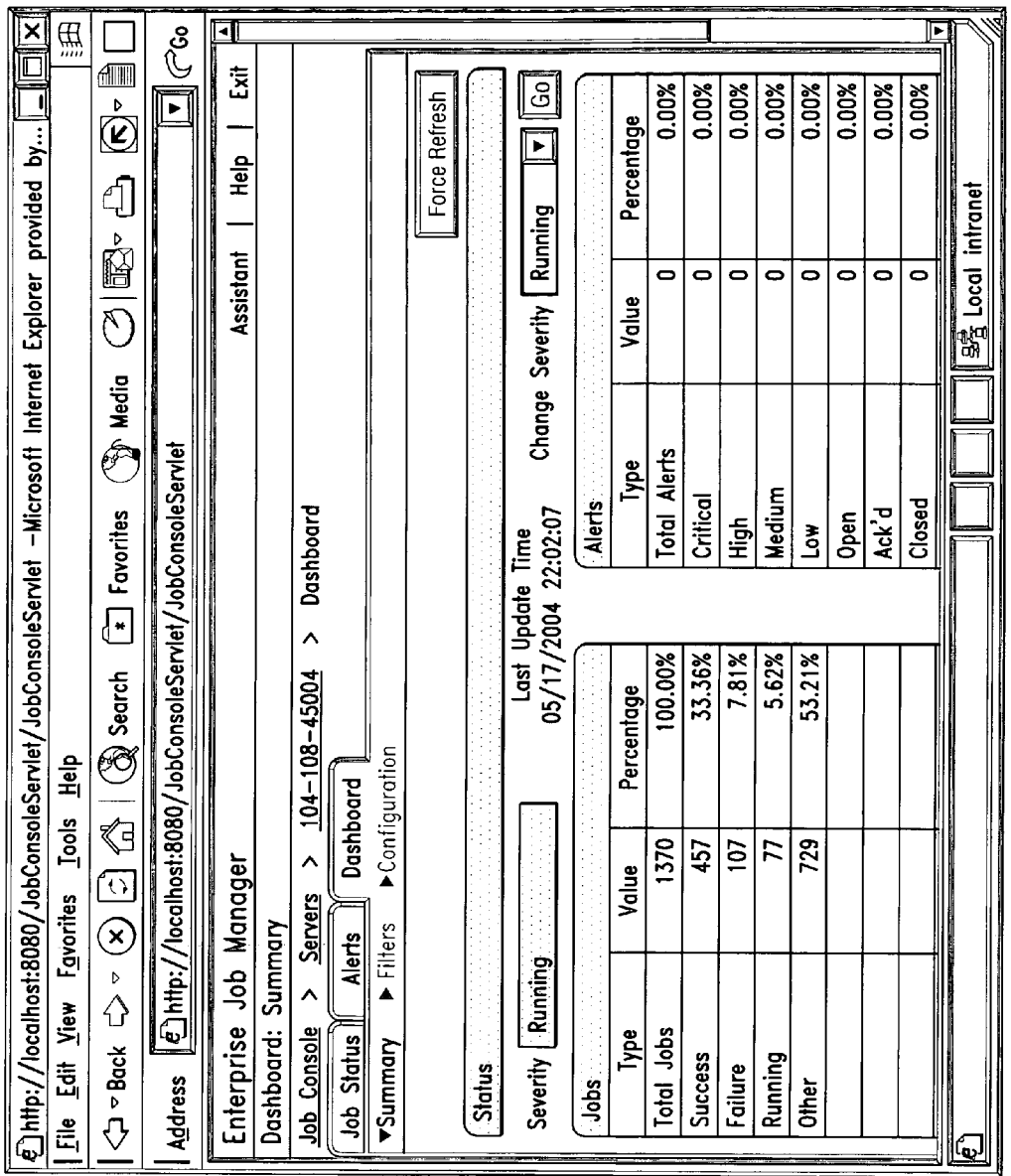
FIGS. 7A-D are example displays for presenting summaries of heterogeneous jobs in the system of FIG. 1 in accordance with one embodiment of the present disclosure.

Turning to the illustrated embodiments, FIG. 7A illustrates an example dashboard view 116*f*. In this view 116*f*, the user may be able to view statistical information and a severity level of jobs and alerts of a user group. In other words, dashboard view 116*f* is a graphical representation of a summary of the user group in the enterprise. In the illustrate embodiments, dashboard view 116*f* includes a job table and an alert table. Each table includes a spreadsheet with several columns and rows, with each intersection comprising a cell. Each cell is populated with information associated with jobs or alerts. The illustrated job table includes three columns: type, value, and percentage. The job table includes a row for each job type (success, failure, running, and other) and a row for total jobs. The illustrated alert table includes the same three columns: type, value, and percentage. The alert table includes a row for each alert type (critical, high, medium, low, open, acknowledged, and closed). In addition, dashboard view 1116*f* indicates a severity level value associated with a user group.

Figure 7B:
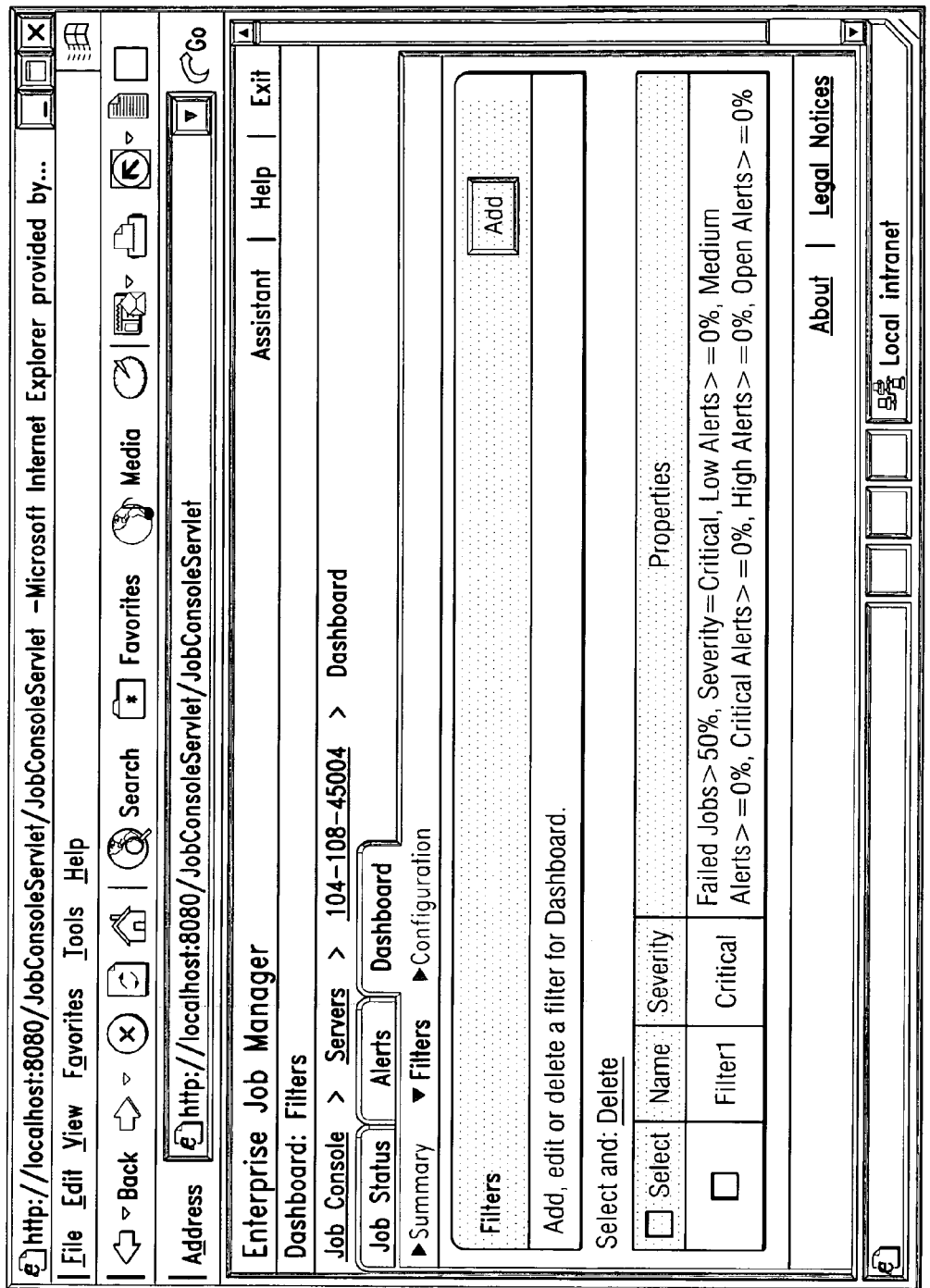
Figure 7C:
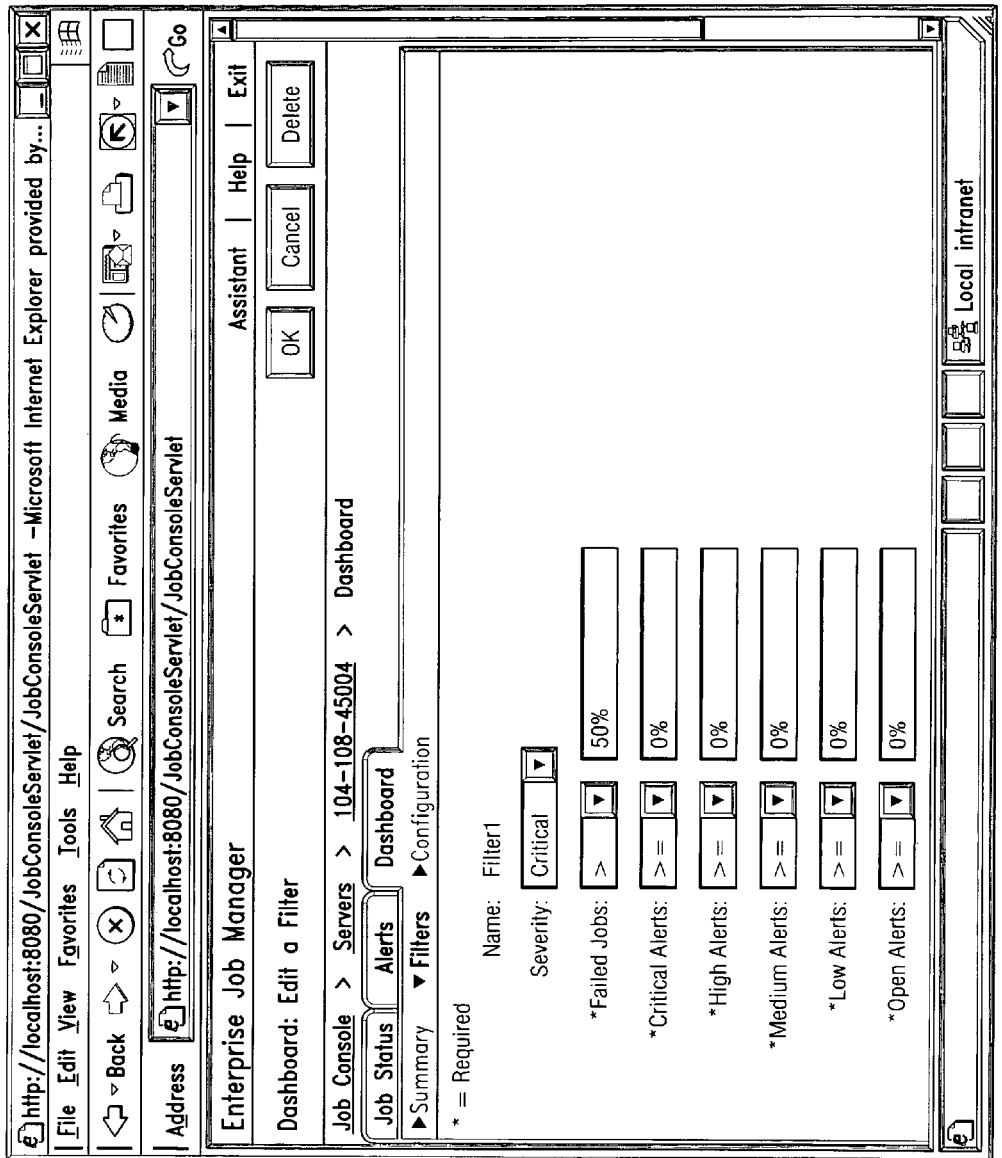
Figure 7D:
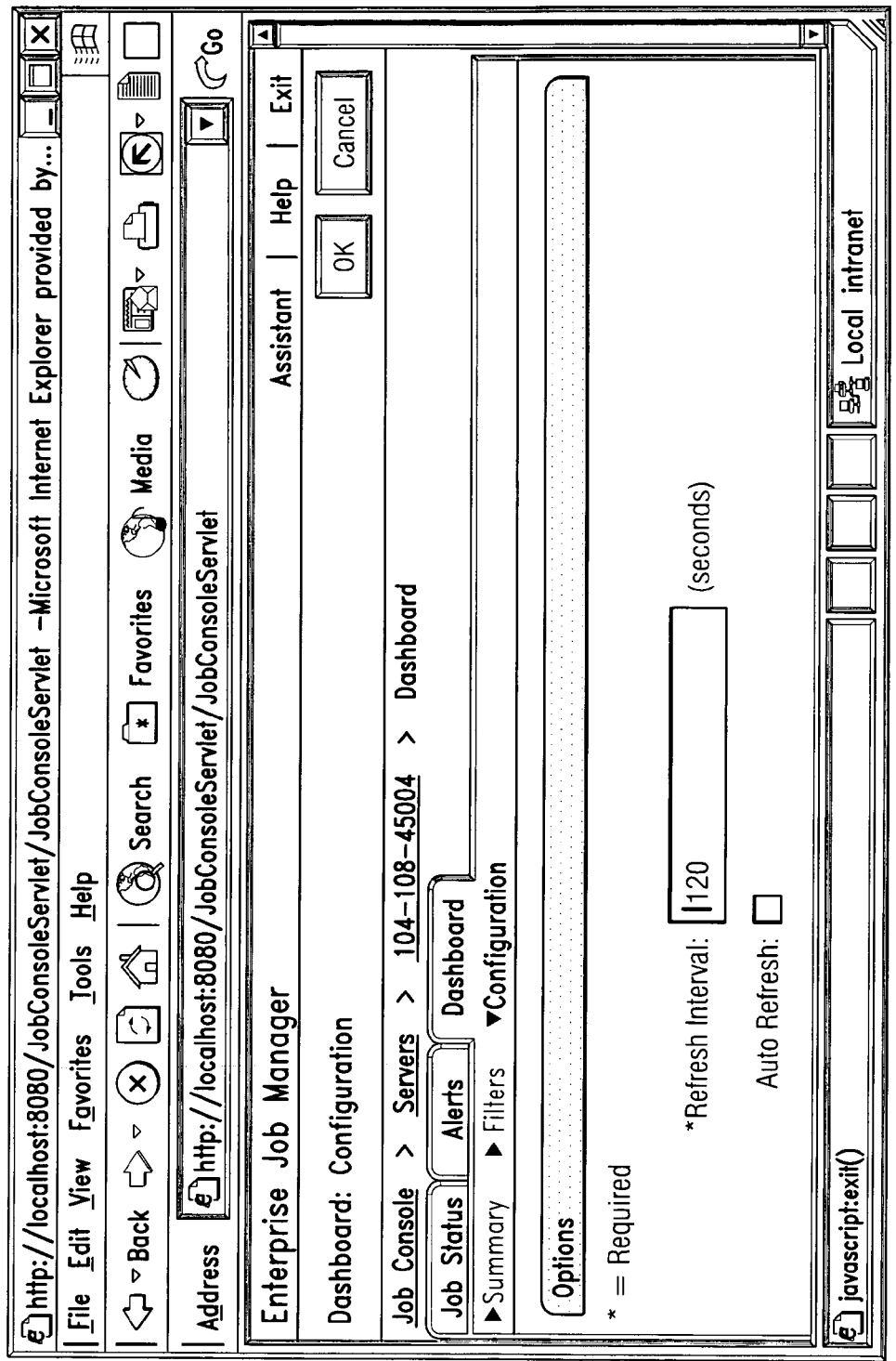

FIGS. 7B-7D illustrate various graphical or tabular views (116*g*-116*i*) that are associated with dashboard view 116*f*. For example, view 116*g* presents a list of dashboard filters that may be applied to the statistical information. More particularly, view 116*g* includes a table with five columns: select, name, severity level, and properties. View 116*g* includes a checkbox associated with each filter such that a user may select a filter by left clicking on the checkbox. In some embodiments, each filter is associated with a different user group. View 116*h* of presents filter criteria to the user. In this view 116*h*, the user of may be able to view or modify various properties of the filters. For example, the user may modify or select the severity level associated with the filter and operators and their associated values for each job type and alert type. View 116*i* allows the user to specify the interval in which the associated filter may be applied.

Figure 8:
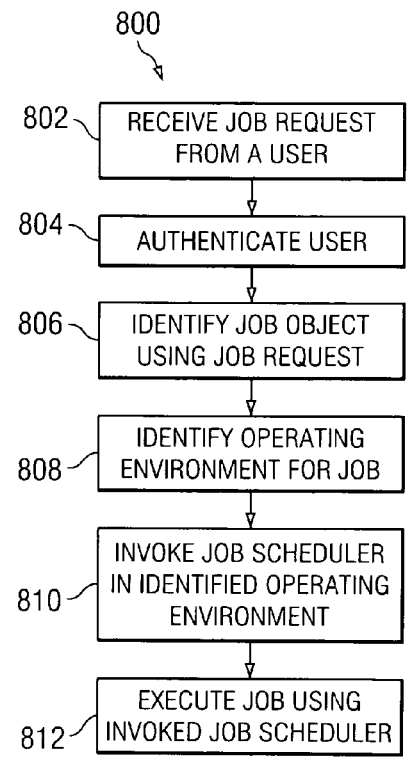
FIG. 8 is a flowchart illustrating an example method for processing a job request in one of a plurality of heterogeneous environments in accordance with one embodiment of the present disclosure.

FIG. 8 is a flowchart illustrating an example method 800 for submitting a job 150 in one or more of a plurality of heterogeneous operating environments 106 in accordance with one embodiment of the present disclosure. At a high level, method 800 includes receiving a job submission from a user and executing job 150 in the appropriate operating environment 106 (or operating environments 106). The following description focuses on the operation of job manager 130 in performing method 800. But system 100 contemplates using any appropriate combination and arrangement of logical elements implementing some or all of the described functionality.

Method 800 begins at step 802, where job manager 130 receives a job request from the user, typically using client 104. But, as described above, the user may submit job request directly to server 102 without departing from the scope of method 800. The job request may comprise one or more of the following types of jobs: an update job, a command, a task, or any other appropriate enterprise job or request. Next, at step 804, job manager 130 authenticates the user. This authentication may include verifying that the user can submit this particular type of job, can update the requested or associated data, or any other security or authentication procedure or technique. Of course, while not illustrated, modules other than job manager 130 may perform this authentication and communicate the results to job manager 130. Job manager 130 then identifies a job object 140 using the received job request at step 806. For example, the job request may include a job identifier or other pointer. In this example, job manager 130 queries the plurality of job objects 140 to determine the particular job object 140 associated with the request based on the pointer. Once the appropriate job object 140 is identified, Job manager 130 identifies operating environments 106 for the job at step 808. As described above, in the case of a distributed job, there may be more than one operating environment 106 associated with the job. Job manager 130 may identify the appropriate operating environment 106 using any suitable technique. For example, job manager 130 may determine the appropriate operating system to execute the job. In another example, job manager 130 may identify the location of the data storage associated with the job request. In yet another example, job manager 130 may identify the appropriate virtual location for executing the job request. Next, at step 810, job manager 130 invokes a job scheduler 137 in the identified operating environment 106. Once job manager 130 has invoked job scheduler, it may execute the job using the invoked job scheduler 137 at step 812. It will be understood that this execution may include an immediate submission, adding the job to queue associated with the invoked job scheduler, or any other appropriate technique.

Figure 9:
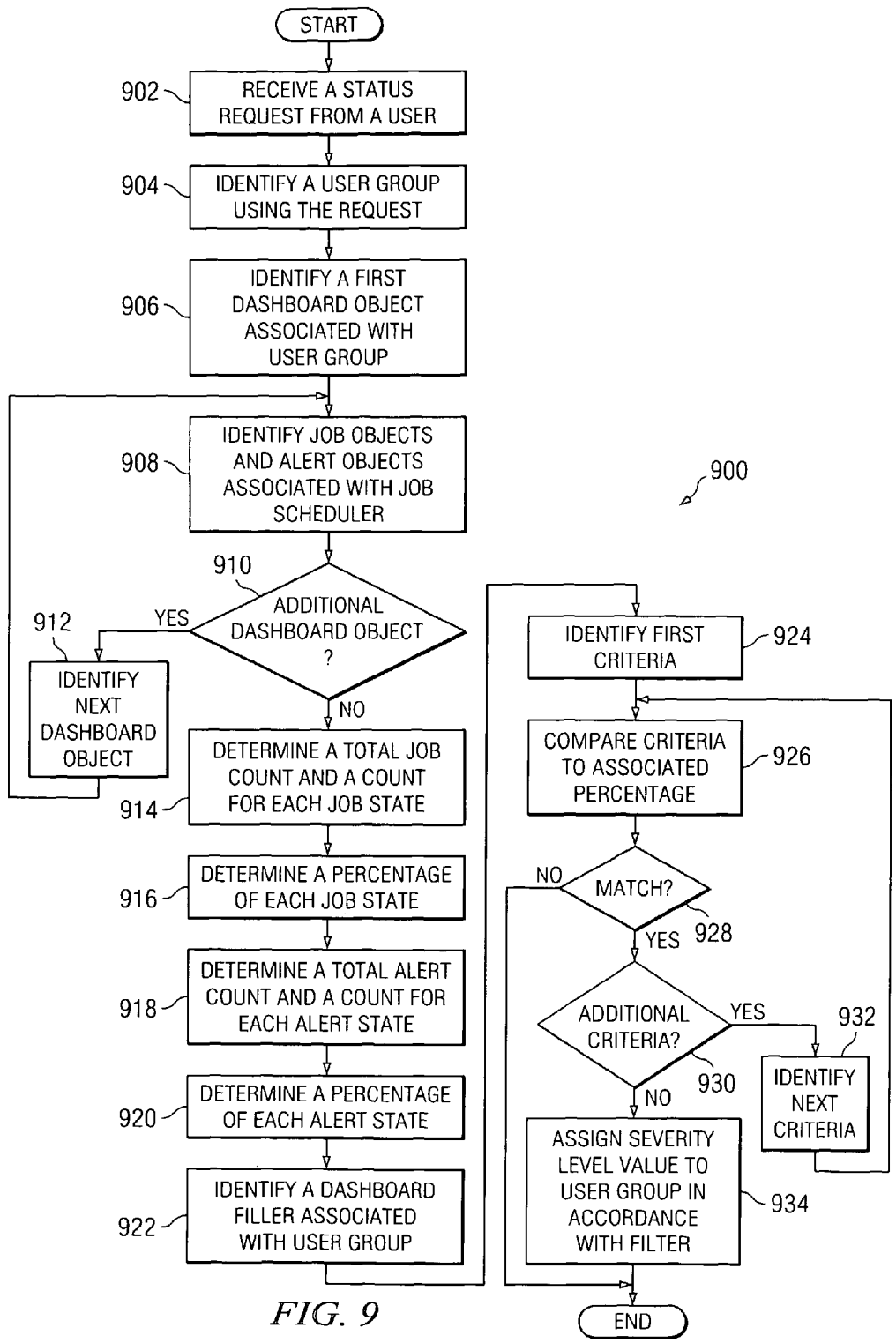
FIG. 9 is a flowchart illustrating an example method for generating a summary for a user group in accordance with one embodiment of the present disclosure.

FIG. 9 is a flowchart illustrating example method 900 for summarizing a user group in accordance with one embodiment of the present disclosure. Generally, method 900 describes one example technique for job manager 130 to identify states of jobs and alerts, determine a summary of the user group of the enterprise, and communicate the summary to a particular user or application. The following descriptions will focus on the operation of job manager 130 in performing this method. But, as with the previous flowchart, system 100 contemplates using any appropriate combination and arrangement of logical elements implementing some or all of the described functionality.

Method 900 begins at step 902, where job manager 130 receives a status request from a user, typically a client 104. Next, at step 904, job manager 130 identifies a user group using the request. For example, job manager 130 may identify that a user group associated with print requests. At step 906, job manager 130 identifies a first dashboard object 144 associated with the user group. After identifying the first dashboard object 144, job manager 130 identifies job objects 140 and alert objects 142 associated using dashboard object 144. Returning to the print example, job manager 130 may identify job objects 140 that represent print request and alert objects 142 associated with printing. At decisional step 910, if the user group is associated with an additional dashboard object 144, then job manager 130 identifies the next dashboard object 144 at step 912. In the example, the first dashboard object 144 may be associated with print request in operating environment 106*a* executing UNIX and the next dashboard object 144 may be associated with operating environment 106*b* executing z/OS. Otherwise, execution proceeds to step 914. Job manager 130 determines a total job count and a count for each job state associated with the user group at step 914. In the print example, job manager 130 may determine a total number of successful print jobs and failed print jobs in operating environments 106a and 106b. Next, at step 916, job manager 130 determines percentage of job states in accordance with dashboard object 144. At step 918, job manager 130 determines a total alert count and a count for each alert state associated with the user group. Again turning to the print example, alert objects 142 may represent specific print jobs and jobsets that were being monitored that entered the failure state, so job manager 130 may determine the number of monitored print request that failed and monitored jobsets that failed. Next, at step 920, job manager 130 determines percentages of alert states in accordance with dashboard object 144.

After determining the statistical information associated with the user group, job manager 130 identifies a dashboard filter associated with the user group at step 922. Job manager 130 then identifies first criteria at step 924. In the print example, the dashboard filter criteria may include a 75% threshold for failed jobs. Next, at step 926, job manager 130 compares the criteria to associated percentages in accordance with dashboard object 144. Turning to the example, job manager 130 determines whether the percentage of failed print request exceeds 75%. If job manager 130 determines a match at decisional step 928, then execution proceeds to decisional step 930. If additional criteria are included in the dashboard filter, then job manager 130 identifies the next criteria at step 932. In the example, the dashboard filter criteria may additional direct job manager 130 to determine whether the percentage of monitored jobsets that failed exceed 25%. If additional criteria are not included in the dashboard filter, then job manager 130 assigns a severity level value to the user group in accordance with the dashboard filter. Returning to the example, in the event that the dashboard criteria are matched, job manager 130 will assign a critical severity level to the print jobs in heterogeneous operating environments 106a and 106b. Returning to decisional step 928, if job manager 130 does not determine a match, then execution ends.

The preceding flowcharts and accompanying description illustrate exemplary methods 800 and 900. System 100 contemplates using any suitable technique for performing these and other tasks. It will be understood that method 800 and 900 are for illustration purposes only and that the described or similar techniques may be performed at any appropriate time, including concurrently, individually, or in combination. In addition, many of the steps in these flowcharts may take place simultaneously and/or in different orders than as shown. Moreover, system 100 may use methods with additional steps, fewer steps, and/or different steps, so long as the methods remain appropriate.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-readable storage medium storing computer-executable instructions for a job manager, wherein the computer-executable instructions configure one or more processors to:
   receive, from a client device, a request for information relating to one or more jobs operating in a plurality of operating environments, wherein at least two of the plurality of operating environments utilize heterogeneous job scheduling nomenclatures;
   identify, based on the request, a group from among a plurality of groups;
   identify at least one dashboard object associated with the group;
   for the identified dashboard object, identify one or more job objects or alert objects associated with the identified dashboard object, wherein the identified job objects or alert objects include a job identifier and a pointer to at least one of the plurality of operating environments, and wherein the identified job or alert objects are used to obtain normalized job or alert data, wherein the normalized job or alert data is obtained by mapping a first set of indicators from a job scheduling nomenclature of a first of the at least two operating environments and a second set of indicators, at least partially different from the first set of indicators, from a job scheduling nomenclature of a second of the at least two operating environments, to a common set of indicators;
   determine the requested information based on at least a portion of the normalized job or alert data; and
   present the requested information to the client device.

2. The computer-readable storage medium of claim 1, wherein obtaining normalized job or alert data includes:
   identifying a state of a first alert associated with a first job from the first of the at least two operating environments; and
   identifying a state of a second alert associated with a second job from the second of the at least two operating environments,
   wherein the requested information is based at least in part on the first alert state and the second alert state.

3. The computer-readable storage medium of claim 1, wherein the job or alert data comprises job state information regarding a plurality of job states for jobs from the plurality of operating environments and alert state information from a plurality of alerts from the plurality of operating environments, and wherein the requested information comprises a percentage of each job state in accordance with a total number of jobs and a percentage of each alert state in accordance with a total number of alerts.

4. The computer-readable storage medium of claim 1, wherein the computer executable instructions further configure the one or more processors to:
   identify a filter comprising criteria for selecting a severity level;
   determine a match with the filter based, at least in part, on the criteria of the filter and the requested information; and
   in response to determining the match, associate the severity level value with the requested information in accordance with the filter.

5. The computer-readable storage medium of claim 4, the severity level comprising one of running, low, medium, high, or critical.

6. A method for filtering jobs, the method executing on one or more processors configured to perform a plurality of operations, the plurality of operations comprising:
   receiving, from a client device, a request for information relating to one or more jobs operating in a plurality of operating environments, wherein at least two of the plurality of operating environments utilize heterogeneous job scheduling nomenclatures;
   identifying, based on the request, a group from among a plurality of groups;
   identifying at least one dashboard object associated with the group;

for the identified dashboard object, identifying one or more job objects or alert objects associated with the identified dashboard object, wherein the identified job objects or alert objects include a job identifier and a pointer to at least one of the plurality of operating environments, and wherein the identified job or alert objects are used to obtain normalized job or alert data, wherein the normalized job or alert data is obtained by mapping a first set of indicators from a job scheduling nomenclature of a first of the at least two operating environments and a second set of indicators, at least partially different from the first set of indicators, from a job scheduling nomenclature of a second of the at least two operating environments, to a common set of indicators;

determining the requested information based on at least a portion of the normalized job or alert data; and presenting the requested information to the client device.

7. The method of claim 6, wherein obtaining normalized job or alert data includes:

identifying a state of a first alert associated with a first job from the first of the at least two operating environments; and identifying a state of a second alert associated with a second job from the second of the at least two operating environments, wherein the requested information is based at least in part on the first alert state and the second alert state.

8. The method of claim 6, wherein the job or alert data comprises job state information regarding a plurality of job states for jobs from the plurality of operating environments and alert state information from a plurality of alerts from the plurality of operating environments, and wherein the requested information comprises a percentage of each job state in accordance with a total number of jobs and a percentage of each alert state in accordance with a total number of alerts.

9. The method of claim 6, wherein the plurality of operations further comprise:

identifying a filter comprising criteria for selecting a severity level;

determining a match with the filter based, at least in part, on the criteria of the filter and the requested information; and in response to determining the match, associating the severity level value with the requested information in accordance with the filter.

10. The method of claim 9, the severity level comprising one of running, low, medium, high, or critical.

11. A system for filtering jobs, comprising:

memory storing a dashboard operable to present information from a plurality of operating environments;

one or more processors configured to:

receive, from a client device, a request for information relating to one or more jobs operating in a plurality of operating environments, wherein at least two of the plurality of operating environments utilize heterogeneous job scheduling nomenclatures, identify, based on the request, a group from among a plurality of groups, identify at least one dashboard object associated with the group, for the identified dashboard object, identify one or more job objects or alert objects associated with the identified dashboard object, wherein the identified job objects or alert objects include a job identifier and a pointer to at least one of the plurality of operating environments, and wherein the identified job or alert objects are used to obtain normalized job or alert data, wherein the normalized job or alert data is obtained by mapping a first set of indicators from a job scheduling nomenclature of a first of the at least two operating environments and a second set of indicators, at least partially different from the first set of indicators, from a job scheduling nomenclature of a second of the at least two operating environments, to a common set of indicators, determine the requested information based on at least a portion of the normalized job or alert data, and present the requested information to a user through the dashboard at the client device.

12. The system of claim 11, wherein obtaining the normalized job or alert data includes:

identification of a state of a first alert associated with a first job from the first of the at least two operating environments; and identification of a state of a second alert associated with a second job from the second of the at least two operating environments, wherein the requested information is based at least in part on the first alert state and the second alert state.

13. The system of claim 11, wherein the job or alert data comprises job state information regarding a plurality of job states for jobs from the plurality of operating environments and alert state information from a plurality of alerts from the plurality of operating environments, and wherein the requested information comprises a percentage of each job state in accordance with a total number of jobs and a percentage of each alert state in accordance with a total number of alerts.

14. The system of claim 11, the one or more processors further configured to:

identify a filter comprising criteria for selecting a severity level;

determine a match with the filter based, at least in part, on the criteria of the filter and the requested information; and in response to determining the match, associate the severity level value with the requested information in accordance with the filter.

15. The system of claim 14, the severity level comprising one of running, low, medium, high, or critical.

16. A system for filtering jobs, comprising:

one or more processors configured to:

receive information relating to a plurality of jobs from a plurality of job schedulers, wherein at least two of the plurality of job schedulers operate on heterogeneous environments utilizing heterogeneous job nomenclature;

generate one or more job or alert objects for each of the plurality of jobs for which information was received, wherein a job or alert object includes:

a job identifier that identifies a job associated with the job or alert object, a pointer to an operating environment associated with the job identified by the job identifier, one or more values represented in the nomenclature specific to the operating environment of the pointer, and a mapping from the nomenclature specific to the operating environment of the pointer to a normalized nomenclature, generate, using information from one or more job or alert objects, one or more summary objects having information from at least two jobs from the plurality of jobs;

receive, from a client device, a request for information from two or more jobs from the plurality of jobs, wherein at least two of the two or more jobs of the request operate on heterogeneous operating environments utilizing heterogeneous job nomenclature;

identify, based on the request, a user group from among a plurality of user groups of an enterprise;

identify one or more of the generated summary objects associated with the user group;

identify normalized values for the at least two jobs from the request using information from at least one of the identified summary objects, the normalized values being normalized using mappings of one or more job or alert objects used to generate the at least one identified summary object;

determine statistical information based on at least a portion of the normalized values; and present the statistical information to the client device.

* * * * *